(12) United States Patent
Carey et al.

(10) Patent No.: US 6,418,327 B1
(45) Date of Patent: Jul. 9, 2002

(54) METHODS AND DETERMINING AN OPTIMUM SECTOR DISTRIBUTION WITHIN A COVERAGE AREA OF A WIRELESS COMMUNICATION SYSTEM

(75) Inventors: Douglas Carey, New York, NY (US); Thomas Peragine, Nashua; Edward Dziadek, Mont Vernon, both of NH (US); Naftali Herscovici, Framingham, MA (US); Donna Ryan, Amherst, NH (US)

(73) Assignee: Spike Broadband Systems, Inc., Nashua, NH (US)

( * ) Notice: Subject to any disclaimer, the term of this patent is extended or adjusted under 35 U.S.C. 154(b) by 0 days.

(21) Appl. No.: 09/287,142

(22) Filed: Apr. 6, 1999

(51) Int. Cl.$^7$ ................................................ H04Q 7/20
(52) U.S. Cl. ...................... 455/562; 455/422; 455/446; 455/453; 455/561
(58) Field of Search ................................. 455/422, 432, 455/436, 446, 453, 513, 560, 561, 562, 522, 277.1, 277.2, 278.1; 370/320, 252, 335, 339, 342

(56) References Cited

U.S. PATENT DOCUMENTS

| | | | |
|---|---|---|---|
| 4,144,496 A | 3/1979 | Cunningham et al. | 325/53 |
| 4,730,310 A | 3/1988 | Acampora et al. | 370/95 |
| 5,073,900 A | 12/1991 | Mallinckrodt | 375/1 |
| 5,073,971 A | 12/1991 | Schaeffer | 455/33 |
| 5,276,907 A * | 1/1994 | Meidan | 455/453 |
| 5,428,818 A | 6/1995 | Meidan et al. | 455/33.3 |
| 5,485,631 A | 1/1996 | Bruckert | 455/33.3 |
| 5,596,333 A | 1/1997 | Bruckert | 342/457 |
| 5,649,292 A | 7/1997 | Doner | 455/447 |
| 5,649,293 A | 7/1997 | Reed | 455/453 |
| 5,771,449 A | 6/1998 | Blasing et al. | 455/422 |
| 5,835,859 A | 11/1998 | Doner | 455/447 |
| 5,838,670 A | 11/1998 | Billström | 370/328 |
| 5,884,147 A | 3/1999 | Reudink et al. | 455/67.1 |
| 5,889,494 A | 3/1999 | Reudink et al. | 342/373 |
| 6,070,090 A * | 5/2000 | Feuerstein | 455/561 |
| 6,094,580 A * | 7/2000 | Yu et al. | 455/453 |
| 6,104,930 A * | 8/2000 | Ward et al. | 455/453 |
| 6,118,767 A * | 9/2000 | Shen et al. | 370/252 |
| 6,128,500 A * | 10/2000 | Raghavan et al. | 455/453 |
| 6,128,506 A * | 10/2000 | Knutsson et al. | 455/453 |

OTHER PUBLICATIONS

"Welcome to the 21st Century, Building a New Technology," Joel Schofield, Wireless Broadcasting Magazine, Jan./Feb. 1997.

(List continued on next page.)

*Primary Examiner*—May Maung
(74) *Attorney, Agent, or Firm*—Wolf, Greenfield & Sacks, P.C.

(57) ABSTRACT

Methods for determining an optimum sector distribution within a coverage area of a wireless communication system are disclosed. A coverage area is divided into a number of sectors, each sector having a respective sector width. The wireless communication system emits a respective radiation pattern designated for each sector. The methods of the invention evaluate the interference in a given sector due to both neighboring radiation pattern main lobes and sidelobes from all other sectors within the coverage area using the same frequency channels. According to the methods of the invention, a sector width and/or radiation pattern may be determined which minimizes the interference, or undesired signal level, while maintaining a sufficiently uniform distribution of the desired signal level in each sector. The various embodiments of methods according to the invention may be implemented using software, for example, in the form of a simulation program.

61 Claims, 19 Drawing Sheets

OTHER PUBLICATIONS

"Advances in Two–Way Data Transmission using Spectrum MMDS," Thomas L. Peragine and Donna J. Ryan, Reprinted from Private Cable & Wireless Cable, Jul. 1998.

"Young and Wireless in Latin America," Alex Swan, International Cable, Jul. 1998.

"Wireless find a Voice at Supercomm," Nancy Gohring, Reprinted from the Jul. 6, 1998 issue of Telephony.

Spike Press Release, Feb. 11, 1997, Spike Technologies Announces the Production of the Prizm 2400 Broadband Delivery System, the First Turnkey System for Full Duplex Broadband Services.

Spike Press Release, Feb. 11, 1997, Spike Technologies Begins Offering Digital Full–Duplex Broadband Services on Two Channels on MMDS Spectrum.

Spike Press Release, May 27, 1998, Merida, Venezuela Selects Spike Technologies PRIZM BDS as the Wireless Communications Platform for the State.

Spike Press Release, Jun. 25, 1997, Spike Technologies Announces Compatibility of its PRIZM Broadband Delivery System with Frequency Spectrum Allocated for Wireless Communications Services (WCS).

Spike Press Release, Jun. 16, 1998, Spike Technologies PRIZM BDS Captures Two of 12 SuperQuest Awards at SuperComm98.

Spike Press Release, Jul. 8, 1998, Third–Rail Wireless Becomes Approved Wireless CLEC for Broadband Multipoint Communications.

Spike Press Release, Oct. 12, 1998, Spike Technologies PRIZM BDS Compliant with FCC Two–Way Rule for Low Frequency Channels.

Wavepath Website, http://www.wavepath.com. Jul. 12, 1999, 5 pages.

Co–pending Application, entitled: Point–to–Multipoint Two–Way Broadband Wireless Communication System, Serial No. 09/287,144, Filed: Apr. 6, 1999.

* cited by examiner

| MODULATION/ DEMODULATION TECHNIQUE | SPECTRAL EFFICIENCY, (bps/Hz) | | CAPACITY (DATA RATE) FOR CHANNEL BW = 6 MHz (Mbps) | APPROXIMATE REQUIRED SNR FOR 10E-6 SYMBOL ERROR RATE (dB) |
|---|---|---|---|---|
| | RECTANGULAR CHANNEL | RAISED COSINE CHANNEL | | |
| BPSK | 1 | 0.833 | 5 | 11 |
| QPSK(QAM-4) | 2 | 1.667 | 10 | 14 |
| QAM-16 | 4 | 3.333 | 20 | 21 |
| QAM-64 | 6 | 5.000 | 30 | 27 |
| QAM-256 | 8 | 6.667 | 40 | 33 |

FIG. 2

| BASE STATION & SUBSCRIBER TRANSCEIVER SPECIFICATIONS | | | |
|---|---|---|---|
| PARAMETER | PERFORMANCE | | REFERENCE CHAR. |
| | LIMITS | UNITS | (FIGURE: 7) |
| RF TRANSMITTER | | | |
| IF INPUT PARAMETERS | | | |
|    INPUT FREQUENCY (SUBSCRIBER) | 10 TO 40 | MHz | (68 UP-CHANNEL) |
|    INPUT FREQUENCY (BASE STATION) | 100 TO 1000 | MHz | 38 DOWN-CHANNEL |
|    INPUT POWER | −10 TO +5 dBm | MHz | 700 |
|    INPUT IMPEDANCE | 75 | OHMS | |
|    INPUT VSWR | 1.7:1 | | |
| | | | |
| RF OUTPUT PARAMETERS | | | |
|    OUTPUT FREQUENCY TUNING RANGE | 2100-2700 | MHz | 28 |
|    (6 MHz BAND) | | | |
|    TRANSMITTER GAIN | 7 TO 51 | dB | 702 |
|    TRANSMITTER GAIN ADJUSTMENT | 44 | dB | |
|    TRANSMITTER GAIN ADJUST STEP SIZE | 1 | dB | |
|    GAIN ACCURACY | ±0.5 | dB | |
|    GAIN FLATNESS OVER CHANNEL | ±0.5 | dB | |
|    MIN 1 dB COMPRESSION POINT | 26 | dBm | 704a |
|    PHASE NOISE AT 10KHz OFFSET | −92 | dBc | |
|    SIGNAL TO NOISE RATIO | 55 | dBc | |
|    OUTPUT IMPEDANCE | 50 | OHMS | |
|    DIPLEXER LOSS | 2.5 | dB | 706 |
| RF RECEIVER | | | |
| RF INPUT PARAMETERS | | | |
|    INPUT FREQUENCY (6 MHz BAND) | 2100-2700 | MHz | 28 |
|    INPUT POWER RANGE | −30 TO −70 | dBm | 708 |
|    NOISE FIGURE | 8 | dB | 710 |
|    INPUT IMPEDANCE | 50 | OHMS | |
| | | | |
| IF OUTPUT PARAMETERS | | | |
|    OUTPUT FREQUENCY (SUBSCRIBER) | 100 TO 1000 | MHz | 68 DOWN-CHANNEL |
|    OUTPUT FREQUENCY (BASE STATION) | 10 TO 40 | MHz | (38 UP-CHANNEL) |
|    RECEIVER GAIN (NOMINAL) | −22 TO 22 | dB | 712 |
|    GAIN FLATNESS | ±1.0 | dB | |
|    GAIN ADJUSTMENT | 44 dB<br>2 dB STEPS | | |
|    INPUT 1 dB COMPRESSION POINT | −20 | dBm | |
|    MINIMUM SIGNAL TO NOISE RATIO | 30 | dB | |
|    (MEASURED IN 3 MHz RES BW) | | | |
|    OUTPUT IMPEDANCE | 75 | OHMS | |

*FIG. 16*

| ANTENNA SPECIFICATIONS | RELATIVE TO MAIN BEAM | PARAMETER | REF. CHAR. (FIG. 7) |
|---|---|---|---|
| FREQUENCY | 2.1–2.7 GHz | TO MATCH TRANSMIT AND RECEIVE FREQUENCIES | |
| GAIN | 24 dBi +/−1dB | TO MIRROR HUB ANTENNA | 716 |
| CROSS POLARIZATION | −28 dB | TO REJECT UNWANTED SIGNAL | |
| 3 dB BEAMWIDTH | 12.5° +/−1.5° | TO EASE ALIGNMENT AT INSTALL | |
| SIDE LOBE LEVEL | −20 dB +/−3dB | TO REJECT UNWANTED SIGNAL | |
| FRONT TO BACK @ 180° | −28 dB | TO REDUCE RADIATION IN UNWANTED DIRECTION | |

FIG. 17

| BASE STATION TO SUBSCRIBER LINK | | REF. CHAR. (FIGURE 7) |
|---|---|---|
| PATH LENGTH | 26.0 MI. | 718 |
| TRANSMIT FREQUENCY | 2.509 GHz | 28 |
| BASE ANTENNA TRANSMIT GAIN | 21.0 dBi | 720 |
| BASE TX TRANS. LINE LOSS | 0.5 dB | 722 |
| BASE DIPLEXER LOSS TX SIDE | 2.5 dB | 706 |
| BASE TX BANDWIDTH | 6.000 MHz | |
| RECEIVER NOISE FIGURE | 8 dB | 710 |

| | | | |
|---|---|---|---|
| BASE TRANSMITTER OUTPUT | 26.0 dBm | 704a | |
| OUTPUT BACKOFF | 5.0 dB | 704b | |
| BASE TRANSMIT POWER | 21.0 dBm | 704 | |
| BASE TX ANTENNA GAIN | 21.0 dBi | 720 | |
| BASE EIRP (dBm) | 39.0 dBm | 728 | |
| BASE EIRP (WATTS) | 7.9W | | |
| DOWN LINK PATH LOSS | 132.9 dB | 726 | |
| SUBSCRIBER Rx ANTENNA GAIN | 24.0 dBi | 716 | |
| SUB Rx SIGNAL LEVEL (RSL) | −69.9 dBm | 708 | EQ. 14 |
| THERMAL NOISE POWER | −98.9 dBm | | EQ. 15 |
| LINK D/U | 30.0 dB | | |
| LINK INTERFERENCE | −99.9 dBm | 724 | |
| TOTAL INTERFERENCE & NOISE | −96.4 dBm | 714 | EQ. 16 |
| SNR = RSL − TIN | 26.5 dB | | EQ. 17 |
| REQUIRED SNR | 14.0 dB | | |
| NOISE MARGIN = SNR − REQ'D SNR | 12.5 dB | | EQ. 18 |

*FIG. 18*

METHODS AND DETERMINING AN OPTIMUM SECTOR DISTRIBUTION WITHIN A COVERAGE AREA OF A WIRELESS COMMUNICATION SYSTEM

FIELD OF THE INVENTION

The present invention relates to wireless communications, and more particularly, to methods for determining either optimum sector widths or optimum radiation patterns within a coverage area of a wireless communication system.

BACKGROUND OF THE INVENTION

The communications industry has long sought increased capacity communication systems that could bring robust communications to the world's population. Much of today's communication traffic is in the form of information carriers that are encoded with digital data representing information to be transported across a communication link. The information transported across the link may often include, for example, voice or video information, as well as textual information or raw data for a particular application.

With the increased use of the Internet and other forms of data communication in recent years, there has been an exponential increase in worldwide data traffic. The increased demand for data communications has essentially outpaced the capacity of existing systems, creating a need for higher capacity communication systems. The capacity of a communication link generally refers to the amount of data that can be reliably transported over the link per unit time and is typically measured in terms of data bits per second (bps).

Wireless communication systems are recognized as an economical and efficient method of interconnecting users. Wireless communication systems may be preferable, particularly in geographic locations such as congested urban areas, remote rural areas, or areas having difficult terrains, where it may be difficult and/or cost-prohibitive to deploy wire conductors or fiber optics. Rather than transporting information on data carriers over a physically "tangible" communication link such as a wire conductor or fiber optic cable, wireless systems radiate data carriers in "open space" throughout a coverage area. The communication link in wireless systems may be generally defined by the radiation profile of the data carriers. Many proposed wireless communication systems, however, are limited in capacity and flexibility.

Often, the data carriers radiated in wireless communication systems are frequency channels having a predetermined bandwidth and carrier frequency within a designated frequency spectrum for a given communication link. Some proposed solutions for increasing the capacity of wireless communication systems have been directed to point-to-multipoint configurations utilizing a sectored antenna system, which permits the reuse of frequency spectrum amongst multiple sectors within a coverage area. By dividing a coverage area into a number of sectors and reusing one or more frequency channels in some of the sectors, the data carrying capacity of the reused frequency channels is essentially multiplied by the number of sectors in which the channels are used.

Accordingly, frequency reuse may increase the data carrying capacity of a given "slice" of spectrum. However, frequency reuse as described above typically requires a sufficient degree of isolation amongst the sectors of a coverage area to insure relatively error-free data transfer. Hence, frequency reuse, and therefore increased capacity, may be achieved at the expense of increased isolation amongst the sectors. This increased sector isolation requirement may pose several engineering challenges to the design of a reliable and efficient wireless communication system.

Some proposed wireless communication systems have employed a technique of "polarization diversity," in which contiguous sectors within a coverage area use the same frequency channels, but at orthogonal polarizations. For example, in one sector, one or more frequency channels may be transmitted and received using a horizontal polarization, and in a contiguous sector, the same frequency channels would be transmitted and received using a vertical polarization, or vice versa. Other wireless communication systems have employed polarization diversity in combination with different frequency channels in contiguous sectors, while also using a number of various frequency reuse schemes in non-contiguous sectors. In general, both approaches have often met with limited success as a result of design constraints on the sectored antenna system which limit the antenna system's performance, particularly in connection with interference amongst the sectors. As discussed above, an undesirable amount of interference amongst the sectors limits the data carrying capacity of such wireless communication systems.

In view of the foregoing, a flexible high-capacity wireless communication system which incorporates an efficient improved sectored antenna system and provides two-way broadband data services would offer several advantages to the communications industry.

SUMMARY OF THE INVENTION

The present invention is directed to methods for determining either optimum sector widths or optimum radiation patterns within a coverage area of a wireless communication system.

In various embodiments of methods according to the invention for determining an optimum sector distribution within a coverage area of a wireless communication system, the coverage area is divided into a plurality of sectors, wherein each sector has a respective sector width. The wireless communication system emits a respective radiation pattern designated for each sector.

In one embodiment, a method according to the invention comprises steps of: a) selecting the radiation pattern designated for each sector; b) selecting the sector width of each sector based on the radiation pattern; c) calculating a desired signal level in a first sector of the plurality of sectors based on the radiation pattern designated for the first sector; d) calculating a sum of undesired interference levels in the first sector based on the radiation patterns designated for at least some other sectors of the plurality of sectors except the first sector; e) calculating a ratio of the desired signal level to the sum of the undesired interference levels for the first sector; f) modifying the sector width of at least the first sector; and g) repeating steps c), d), e), and f) until the ratio for the first sector is maximized.

In another embodiment, a method according to the invention comprises steps of: a) selecting the sector width of each sector; b) selecting the radiation pattern designated for each sector based on the sector width; c) calculating a desired signal level in a first sector of the plurality of sectors based on the radiation pattern designated for the first sector; d) calculating a sum of undesired interference levels in the first sector based on the radiation patterns designated for at least some other sectors of the plurality of sectors except the first sector; e) calculating a ratio of the desired signal level to the sum of the undesired interference levels for the first sector;

f) modifying the radiation pattern designated for at least one sector; and g) repeating steps c), d), e), and f), substituting the modified radiation pattern designated for the at least one sector for the radiation pattern designated for the at least one sector, until the ratio is maximized.

Other advantages, novel features, and objects of the invention will become apparent from the following detailed description of the invention when considered in conjunction with the accompanying drawings.

BRIEF DESCRIPTION OF THE DRAWINGS

The accompanying drawings, which are herein incorporated by reference, are not intended to be drawn to scale. In the drawings, each identical or nearly identical component that is illustrated in various figures is represented by a like numeral. For purposes of clarity, not every component may be labeled in every drawing. In the drawings:

FIG. 2 is a chart comparing examples of different data carrier modulation/demodulation techniques which may be used in the communication system of FIG. 1C;

FIG. 16 is a chart showing exemplary design parameters for a transceiver of the base station of FIG. 5;

FIG. 17 is a chart showing exemplary design parameters of a subscriber directional antenna as shown in FIG. 3;

FIG. 18 is a chart showing an example of a link budget analysis for the downstream communication link shown in FIG. 7, using parameters from FIGS. 16 and 17.

DETAILED DESCRIPTION

Figure 1B:
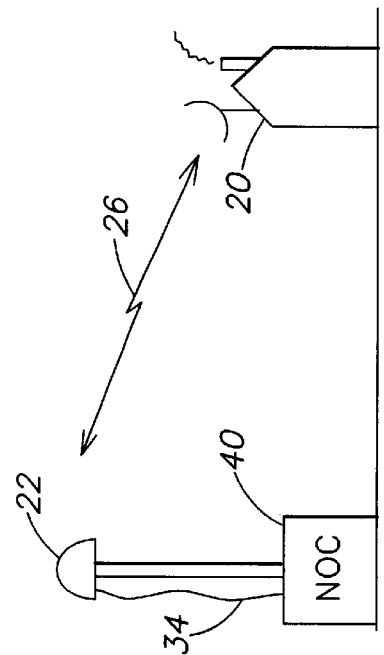
FIGS. 1A and 1B are diagrams of a wireless communication system according to one embodiment of the invention.

The present invention is directed to an efficient high-capacity point-to-multipoint wireless communication system. The wireless communication system of the invention employs a dielectric lens-based sectored antenna system at a base station to transport data amongst one or more remote "fixed subscriber stations" dispersed over a sectored coverage area. Each subscriber station is fixed in location and may serve one or more end-users. The system of the invention transmits data to and receives data from the fixed subscriber stations over one or more independent two-way broadband wireless communication links for each sector of the coverage area. The system increases the capacity of any data carrier, or frequency channel, used over the wireless communication links by reusing one or more channels amongst the sectors. Additionally, the system is capable of simultaneously transmitting the data carriers of all of the independent two-way wireless links using the same polarization in each sector.

The wireless communication system of the invention also includes a switching infrastructure which connects the sectored antenna system to an external data network. The switching infrastructure transports data between the external data network and the fixed subscriber stations, or between two or more fixed subscriber stations, by way of the sectored antenna system. The antenna system is coupled to the switching infrastructure using an internal communication link which operates in a frequency range that is different from that of the two-way broadband wireless communication links between the antenna system and the fixed subscriber stations.

The external data network to which the wireless communication system of the invention is connected may be a local or wide area network, and in particular may be an Ethernet or packet-switched data network such as the Internet, or a telephony infrastructure using Internet protocol or other data protocol. Additionally, one or more of the fixed subscriber stations may itself be another base station according to the invention, allowing the system to be linked with a number of similar systems to form a wireless communication network backbone. In this manner, the wireless communication system of the invention may provide a variety of communication services to end-users at the fixed subscriber stations, such as video conferencing, telephony, high-speed Internet access, and two-way high-speed voice and data transfer.

The wireless communication system of the invention may transmit data to and receive data from the fixed subscriber stations, or may be linked to similar wireless communication systems, using a variety of frequency spectra. In particular, the system of the invention may communicate to fixed subscriber stations using Multi-channel Multi-point Distribution System frequencies (the MMDS frequency spectrum) from approximately 2.5 GHz to 2.7 GHz, which has several advantages in that it is fairly robust against rain and other potentially adverse environmental conditions.

Figure 1A:
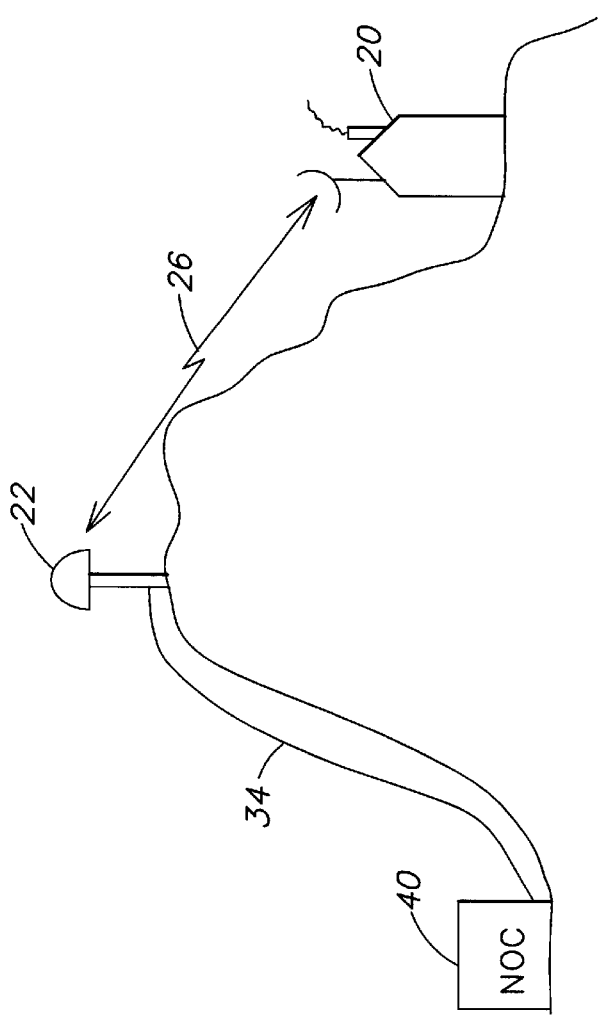

FIGS. 1A and 1B are diagrams of a wireless communication system according to one embodiment of the invention. The system shown in FIGS. 1A and 1B includes one or more fixed subscriber stations 20, a base station 22, and a network operation center (NOC) 40. The fixed subscriber stations 20 are stationary in location, and are generally located remotely from the base station 22, for example at a distance of up to approximately 30 miles. The network operation center 40 may also be located remotely from the base station 22. For example, the base station 22 may be located on a rooftop or tower, and the network operation center 40 may be located within a building below the base station 22, as shown in FIG. 1B. Similarly, the base station 22 may be located on a hilltop and the network operation center 40 may be located at a lower altitude, as shown in FIG. 1A. In general, the base station 22 may be situated at a substantially higher altitude than the network operation center 40, and may be separated from the network operation center 40 by a distance of, for example, up to approximately 500 feet.

In a preferred embodiment of the invention, the base station 22 has a substantially clear line of sight with the fixed subscriber stations 20, but other embodiments may not require this and may allow for at least a partially obstructed line of sight between the base station 22 and the fixed subscriber stations 20. As shown in FIGS. 1A and 1B, the base station 22 transmits data to and receives data from the fixed subscriber stations 20 over one or more two-way broadband wireless communication links 26, and transmits data to and receives data from the network operation center 40 over an internal communication link 34.

Figure 1C:
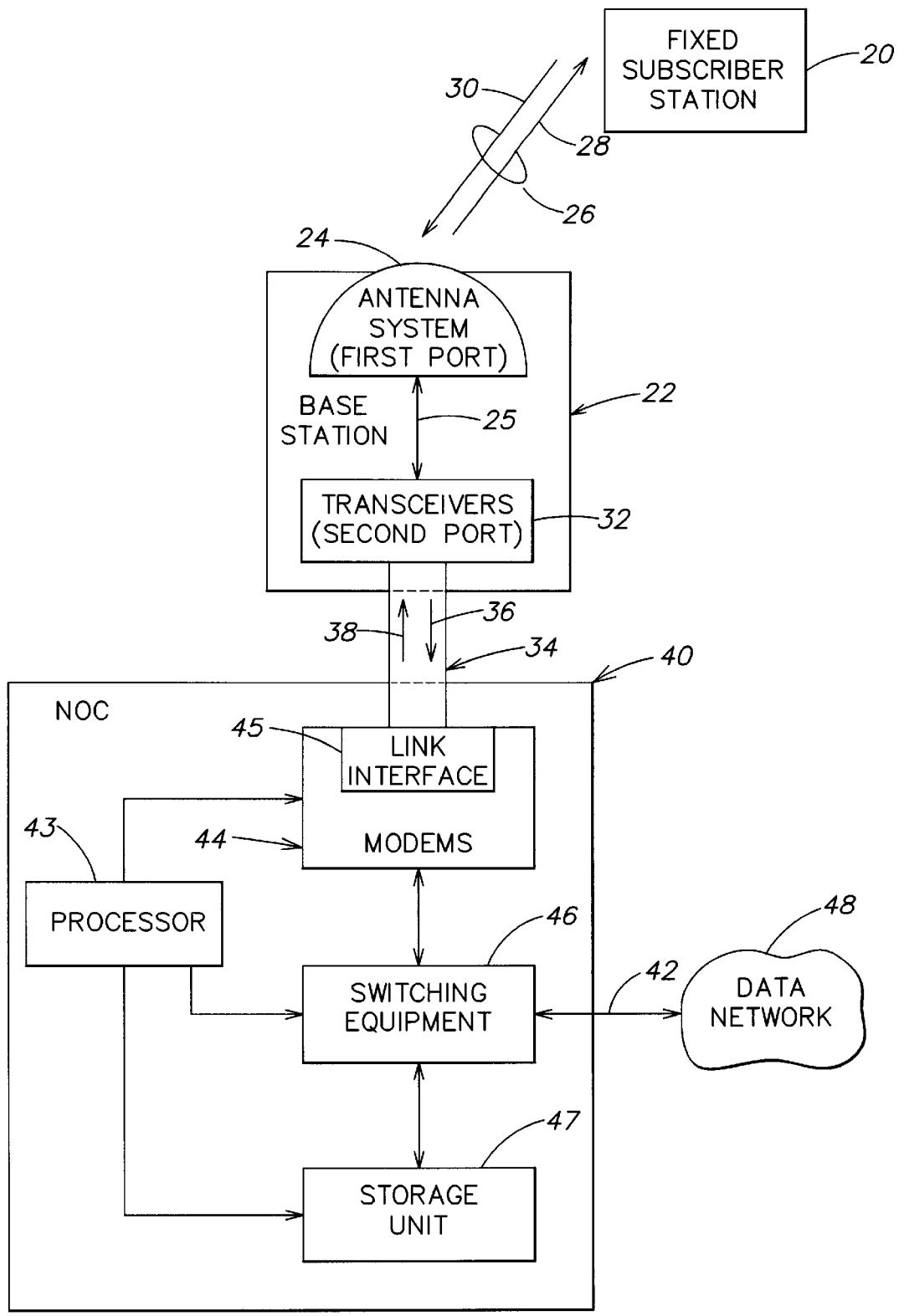
FIG. 1C is a more detailed block diagram of the wireless communication system shown in FIGS. 1A and 1B according to one embodiment of the invention.

FIG. 1C is a more detailed block diagram of the wireless communication system shown in FIGS. 1A and 1B, according to one embodiment of the invention. In the system of FIG. 1C, the base station 22 includes a first port 24 through which data is transported to and from the fixed subscriber stations 20 over one or more two-way broadband wireless communication links 26, using one or more data carriers 28 and 30 within a first frequency range. The base station 22 also includes a second port 32 through which data is transported over an internal communication link 34 using one or more data carriers 36 and 38 within a second frequency range.

Examples of frequency ranges suitable for the data carriers of the two-way broadband wireless communication link 26 include, but are not limited to, the Multi-point Distribution Services (MDS) spectrum from 2.15 GHz to 2.156 GHz, the Multi-channel Multi-point Distribution Services (MMDS) spectrum from 2.5 GHz to 2.686 GHz, the Wireless Communication Services (WCS) spectrum, which is a 30 MHz band at approximately 2.3 GHz, the National Information Infrastructure (NII) spectrum from 5 GHz to 6 GHz, and the Local Multi-Point Distribution Services (LMDS) spectrum, near 28 GHz. In general, the two-way broadband wireless communication link 26 may use data carriers within a frequency range of approximately 1 GHz to 40 GHz, including spectrum which may or may not be presently developed or licensed by the Federal Communications Commission (FCC).

In a preferred embodiment of the system shown in FIGS. 1A–C, the frequency range of the internal communication link 34 is different from the frequency range of the wireless communication link 26. For example, the wireless communication link 26 may preferably use MMDS spectrum from 2.5 GHz to 2.7 GHz, which is divided into approximately thirty frequency channels each having a bandwidth of approximately 6 MHz. In contrast, the internal communication link 34 may use a spectrum having a range of approximately 10 MHz to 1000 MHz, which includes frequencies typically used for public and cable television broadcasting. Furthermore, in addition to using MMDS spectrum to communicate to one or more fixed subscriber stations, the wireless communication link 26 may use a band of spectrum in the vicinity of 12 GHz to 18 GHz to communicate with one or more other base stations (not shown) as part of a wireless "backbone" network, while the internal communication link 34 may use optical data carriers having frequencies in a range of approximately $10^3$ GHz to $10^8$ GHz.

From the foregoing, it should be appreciated that a wide variety of frequency ranges for the two-way broadband wireless communication link 26 and the internal communication link 34 of the system shown in FIGS. 1A–C are suitable for purposes of the invention. Additionally, various physical media and communication protocols may be used for the internal communication link 34, depending in part on the choice of frequency range for the internal link. For example, the internal communication link 34 may include one or more coaxial cables, fiber optic cables, internal wireless communication links or combinations thereof. Additionally, the data carriers of internal link 34 may include one or more unique frequency channels having a suitable bandwidth for a particular application, as discussed further below.

In FIG. 1C, the network operation center 40 is shown coupled to the internal communication link 34 and an external communication link 42, and serves to transport data between the base station 22 and the external communication link 42. FIG. 1C also shows that the external communication link 42 couples the network operation center 40 to an "external" data network 48. In a preferred embodiment of the invention, data network 48 is a packet-switched network, such as the Ethernet, and may be, for example, a local or wide-area network, the Internet, or a telephony infrastructure using Internet protocol or other data protocol. The wireless communication system of FIG. 1C couples one or more fixed subscriber stations 20 to the data network 48 to provide a variety of communication services to the fixed subscriber stations, such as, but not limited to, video conferencing, telephony, high-speed Internet access, and two-way high-speed voice and data transfer.

FIG. 1C shows that the network operation center 40 may include one or more modems 44 coupled to the internal communication link 34 to transmit data to and receive data from the base station 22. The network operation center 40 may also include switching equipment 46 coupled to the external communication link 42 and to the modems 44 to transmit data to and receive data from any of the modems 44 in a predetermined manner, or between any of the modems 44 and the external communication link 42.

The modems 44 modulate, or "encode," one or more data carriers of the internal communication link 34 with data received from the switching equipment 46 to transmit the data to the base station 22. The modems 44 also demodulate, or "decode," the data carriers received from the base station 22 over the internal communication link 34 to obtain or recover data, which the modems then transmit to the switching equipment 46.

A variety of data carrier modulation and demodulation techniques may be employed by the modems 44. The modulation and demodulation techniques used by modems 44 in different embodiments of the invention may be based in part on the physical medium, the frequency range, and the communication protocol used by the internal communication link 34, as discussed further below. In a preferred embodiment of the invention, each modem 44 transmits data to and receives data from the base station 22 using a unique pair of frequency channels as data carriers over the internal communication link 34.

Examples of modulation/demodulation techniques employed by the modems 44 suitable for purposes of the invention include, but are not limited to, binary phase shift keying (BPSK), M-ary phase shift keying, and various types of quadrature amplitude modulation (QAM), including quadrature phase shift keying (QPSK or QAM-4). A variety of factors may influence the choice of a particular modulation/demodulation technique for the modems 44, such as spectral efficiency, robustness (susceptibility to error), and circuit complexity. These factors are discussed briefly below.

Spectral efficiency ($\in$) is a measure of the amount of data throughput, or capacity, a particular modulation/demodulation technique can support for a particular frequency channel bandwidth, and is given in terms of bits per second per Herz (bps/Hz) by the expression $$\epsilon = \frac{C}{BW}, \quad (1)$$

where C is the data rate, or channel capacity, in bits per second (bps), and BW is the bandwidth of the frequency channel carrying the data, in Hz. Each particular modulation/demodulation technique has an associated spectral efficiency $\in$, and once a modulation/demodulation technique is selected, the effective bandwidth BW of a given frequency channel determines the channel capacity. The effective bandwidth of a frequency channel is generally a function of the shape of the signal spectrum used for the channel; a theoretical maximum bandwidth channel may be represented by a rectangular spectrum, while an example of a more commonly employed channel shape may be given by a raised cosine spectrum.

Robustness refers to the amount of outside interference or "noise," for example additive white or Gaussian noise, transient noise bursts, and interference from other channels, that a modem can tolerate while reliably transmitting or receiving data carriers and insuring relatively error-free data transfer. The noise power in a given frequency channel is typically measured relative to some desired signal power in the channel, and is commonly expressed as a signal-to-noise ratio (SNR), in units of relative power, or decibels (dB).

A particular choice of modulation/demodulation technique for a modem typically involves a tradeoff between spectral efficiency, robustness, and circuit complexity; generally, more spectrally efficient modulation/demodulation techniques are less robust and require more complex circuitry. FIG. 2 shows a table comparing the spectral efficiency $\in$ in bps/Hz, and the corresponding required SNR for various examples of modulation/demodulation techniques. From FIG. 2, it can be seen that modulation/demodulation techniques having higher spectral efficiencies $\in$ have more stringent SNR requirements for a given frequency channel. FIG. 2 also shows examples of the data rate, or channel capacity, in megabits per second (Mbps) for different modulation/demodulation techniques, based on a raised cosine spectrum channel bandwidth BW of 6 MHz.

In a preferred embodiment of the invention, each modem 44 of the system of FIG. 1C uses a QAM-4 modulation/demodulation technique for both transmitting data to and receiving data from the base station 22, but other embodiments may employ other modulation/demodulation techniques, as well as different techniques for transmitting and receiving in a single modem. From FIG. 2, it can be seen that the choice of a QAM-4 modulation/demodulation technique requires a theoretical SNR for each frequency channel of approximately 14 dB or higher to insure a data error rate of 10E-6 symbols/second.

While the theoretical SNR requirement may serve as an appropriate guideline, in practice a more conservative engineering design specification for a wireless communication system according to one embodiment of the invention would include a "noise margin" of approximately 10 dB or higher, thereby bringing the actual required SNR for each frequency channel to approximately 24 dB or higher. Some aspects of system design which may contribute noise or interference to a frequency channel, and hence impact an overall "noise budget" as dictated by the theoretical or actual required SNR for each channel, are discussed further below in connection with FIG. 7. It should be appreciated that the SNR required by each modem 44 as a result of choosing a particular modulation/demodulation technique, which may or may not include a noise margin, is the starting point for the optimum design of a wireless communication system according to one embodiment of the invention.

With reference again to FIG. 1C, in a preferred embodiment of the invention each modem uses a unique pair of 6 MHz bandwidth QAM-4 frequency channels over one or more coaxial cables serving as the internal communication link 34. One channel of the pair is used for transmitting data and another channel of the pair is used for receiving data. As a result, in accordance with FIG. 2, each channel has a capacity of up to approximately 10 Mbps. The 6 MHz bandwidth of the channels is based upon a preferred choice of MMDS spectrum for the wireless communication link 26, in which the MMDS spectrum is divided into approximately thirty 6 MHz channels. It should be appreciated, however, that other choices of channel bandwidth are possible in other embodiments of the invention, and the spectral efficiency dictated by the modulation/demodulation technique employed by the modems 44 may be used to determine the channel capacity associated with a given bandwidth, as given by Eq. (1). Furthermore, in one embodiment, once a channel bandwidth is selected for any frequency channel, it may remain fixed during normal operation of the system, although other embodiments might not require this.

Additionally, in the preferred embodiment, the internal communication link 34 uses an intermediate frequency (IF) range approximately corresponding to public or cable television broadcast frequencies for the unique pair of frequency channels associated with each modem 44, wherein one channel of the pair preferably has a carrier frequency of approximately 10–40 MHz, and the other channel of the pair preferably has a carrier frequency of approximately 100–1000 MHz. The lower carrier frequencies of the channels used over the internal communication link 34 make possible a significant separation between the base station 22 and the network operation center 40 without appreciable signal loss in the one or more coaxial cables used for the link 34. As a result, the base station 22 may be located on a rooftop of a tall building or on top of a tower while the network operating center 40 may be located in a building on the ground or on a lower floor, as discussed above.

In other embodiments, the internal communication link 34 may use data carriers in a variety of frequency ranges over a variety of physical media in addition to or in place of one or more coaxial cables; for example, the link 34 may use one or more optical fibers and/or wireless links. Each modem 44 may also include a suitable link interface 45 to appropriately accommodate the frequency range used for the internal communication link 34. Examples of link interfaces suitable for purposes of the invention include, but are not limited to, intermediate frequency (IF), radio frequency (RF), or optical frequency transceivers, which may be either integrated with, or discrete components coupled to, the modems 44.

With reference again to FIG. 1C, the switching equipment 46 of the network operation center 40 may transport data between two or more fixed subscriber stations 20, or between any fixed subscriber station 20 and the external communication link 42. In particular, the switching equipment 46 transmits data to and receives data from a single modem 44, or transports data between two or more modems 44 or between any one of the modems 44 and the external communication link 42 in a predetermined manner. Examples of switching equipment 46 suitable for purposes of the invention include, but are not limited to, high-speed Ethernet switches, asynchronous transfer mode (ATM) switches, and data routers.

FIG. 1C also shows that external communication link 42 is coupled to a data network 48, which may be, for example, a packet-switched data network. In packet-switched data networks, typically a source address and a destination address are included in a "packet" of data. The switching equipment 46 is preferably constructed and arranged so as to direct data, in the form of packets, between the data network 48 and an appropriate fixed subscriber station 20, or between two or more fixed subscriber stations 20, as determined by the respective source and destination addresses of each data packet. In this manner, one or more fixed subscriber stations 20 communicate with one another and with the data network 48 through the switching equipment 46 via data packets.

FIG. 1C also shows that the network operation center 40 may include a processor 43 and a storage unit 47. The processor 43 may be, for example, one or more computers that serve to coordinate the activities of the modems 44, the switching equipment 46, and the storage unit 47, as discussed further below.

The storage unit 47 may be used to archive any data transported through the switching equipment 46. The storage unit 47 may include various forms of memory or mass data storage, including one or more conventional hard disk drives, optical storage media, integrated circuit memory, or any combination of the above. The storage unit 47 may be used to offer "data vaulting" services to one or more fixed subscriber stations. For example, the network operation center 40 can archive data received from one or more fixed subscriber stations 20 for a prescribed period of time using storage unit 47, and return some or all of the archived data upon a request by one or more of the same or different fixed subscriber stations at any time.

In the wireless communication system of FIG. 1C, the first port 24 of base station 22 may include an antenna system 24 to transmit and receive data carriers 28 and 30 which transport data over the broadband wireless communication link 26. Additionally, the second port 32 of the base station 22 may include one or more transceivers 32, coupled to the internal data communication link 34 and to the antenna system 24 via link 25. The transceivers 32 convert the data carriers of wireless communication link 26 received by the antenna system 24 to data carriers of the internal communication link 34 which transport data to the network operation center 40. Similarly, the transceivers 32 convert data carriers received over the internal communication link 34 from network operation center 40 to data carriers for transmission by the antenna system 24 over the wireless communication link 26. The antenna system 24 and the transceivers 32 are discussed in greater detail below, in connection with FIGS. 4 and 5.

Figure 3:
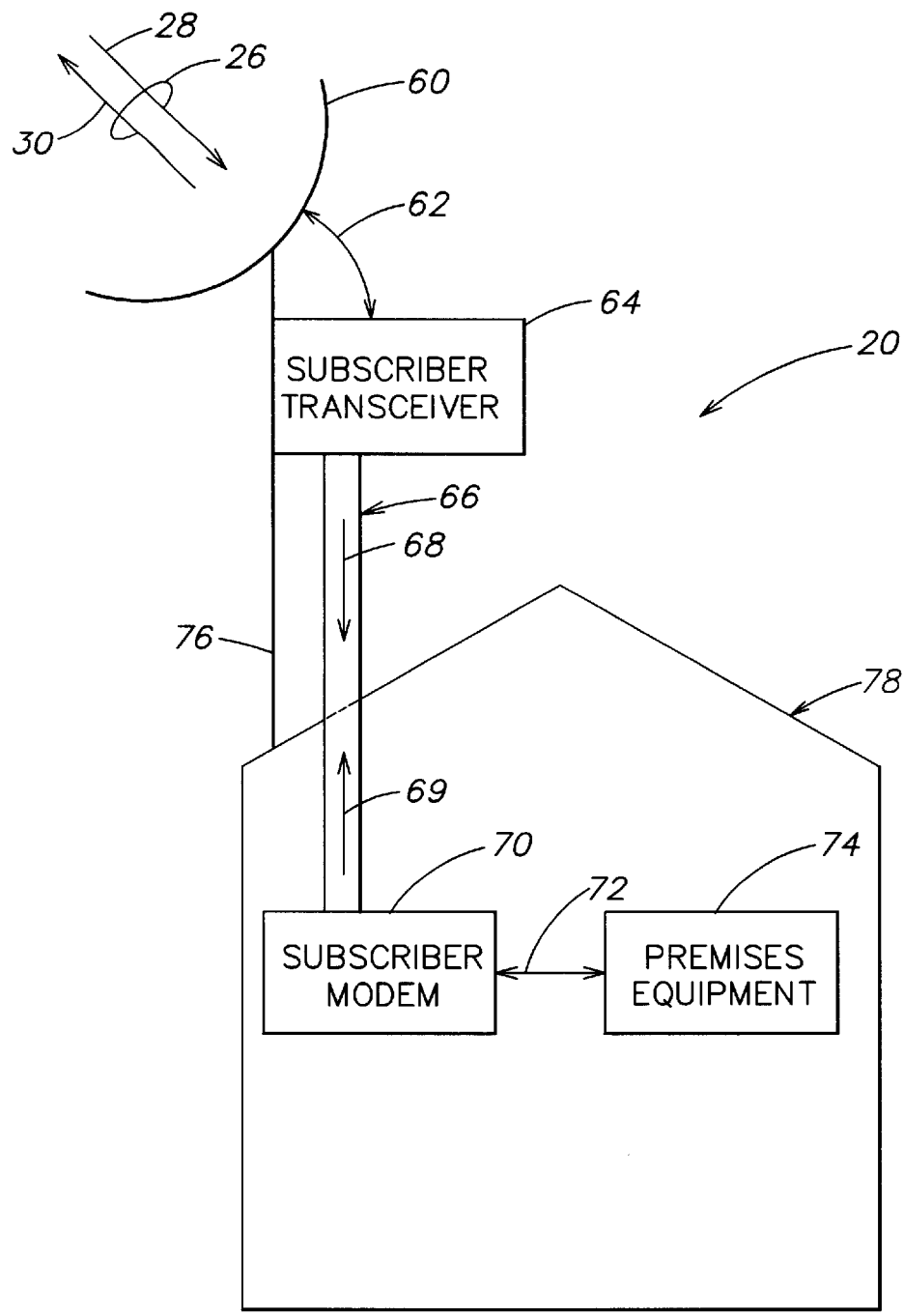
FIG. 3 is a diagram of a fixed subscriber station of the wireless communication system of FIG. 1C according to one embodiment of the invention.

FIG. 3 shows an example of a fixed subscriber station 20 according to one embodiment of the invention. In FIG. 3, the fixed subscriber station 20 is shown deployed in a structure 78, such as a residence, office building, or the like. The fixed subscriber station 20 preferably includes a directional antenna 60 which, for example, may be mounted to the structure 78 via mount 76 as shown in FIG. 3, or may be affixed to a tower in close proximity to structure 78. The directional antenna 60 transmits data encoded on one or more data carriers 30, and receives data encoded on one or more data carriers 28, to and from the base station 22 over the two-way broadband wireless communication link 26.

In a preferred embodiment of the invention, the directional antenna 60 is a mesh parabolic antenna, although other types of antennas may be suitable for other embodiments. In general, however, the directional antenna 60 may be constructed and arranged so as to balance aesthetics, weight, and ease of installation with engineering requirements for low radiation sidelobes, high gain, and narrow focusing for the data carriers 28 and 30 of the wireless communication link 26. Such engineering requirements are in part dictated by the required SNR of the modems 44, as discussed above in connection with FIG. 2. Various system design parameters relating to antenna radiation patterns are discussed in greater detail below, in connection with FIGS. 8–14. The directionality of antenna 60 may be particularly relevant in wireless communication backbone networks, in which two or more wireless communication systems according to the invention are deployed in close proximity and have tangential or overlapping respective coverage areas in which data carriers having similar frequency ranges are used.

The directional antenna 60 of the fixed subscriber station 20 shown in FIG. 3 is coupled via a link 62 to a subscriber transceiver 64 which is, in turn, coupled to an internal subscriber communication link 66. Preferably, the internal subscriber communication link 66 uses data carriers 68 and 69 within a frequency range that is different from that of the data carriers 28 and 30 of the wireless communication link 26.

The subscriber transceiver 64 of FIG. 3 converts at least one data carrier 28 of the wireless communication link 26 received by the directional antenna 60 to at least one data carrier 66. Likewise, the subscriber transceiver 64 converts at least one other data carrier 69 from the internal subscriber communication link 66 to at least one other data carrier 30 of the wireless communication link 26 for transmission by the directional antenna system 60. The subscriber transceiver 64 may be constructed similarly to that of the transceivers 32 of the base station 22 shown in FIG. 1C, as discussed further below. Additionally, as with the internal communication link 34 between the base station 22 and the network operation center 40 of FIG. 1C, the internal subscriber communication link 66 may include one or more coaxial cables, fiber optic cables, internal subscriber wireless communication links, or combinations thereof.

The fixed subscriber station 20 shown in FIG. 3 also includes a subscriber modem 70 to transport data between the internal subscriber communication link 66 and subscriber premises equipment 74, and to encode and decode the data carriers 68 and 69 of the internal subscriber communication link 66. The subscriber modem 70 may be similar to the modems 44 of the network operation center 40 of FIG. 1C, and are constructed and arranged to function cooperatively with modems 44 using similar data carrier modulation and demodulation techniques. However, it should be appreciated that while the modems 44 may be designed to transmit data to and receive data from a number of fixed subscriber stations, as discussed further below, the subscriber modem 70 need only accommodate communication between the base station 22 and one subscriber station 20. The premises equipment 74 is coupled to the subscriber modem 70 via data link 72 and may include, for example, one or more personal computers, video monitors, telephones, and the like. Additionally, the premises equipment 74 may include a packet-switched network interface (not shown) to couple various end-user devices included in the premises equipment 74 to the data link 72.

While the fixed subscriber station 20 shown in FIG. 3 shows only one transceiver 64 and one modem 70, the fixed subscriber station 20 may include more than one transceiver 64 and modem 70, respectively, and may use a number of data carriers to transport data over the internal subscriber communication link 66 and the wireless communication link 26. Each subscriber modem 70 may be coupled to a respective subscriber transceiver 64, as well as to respective premises equipment 74.

Additionally, it should be appreciated that the fixed subscriber station 20 may have a number of actual "end-users." For example, the fixed subscriber station 20 may be an office building serving one or more businesses, a multiple dwelling unit including a number of residences, or a government facility having a number of branches. Each end-user of the fixed subscriber station 20 may have a unique address, so that data in the form of packets each having a source and destination address and transported between the base station and the fixed subscriber station may be directed appropriately by one or more subscriber modems 70 and by the switching equipment 46 of the network operation center 40, as discussed above.

Figure 4:
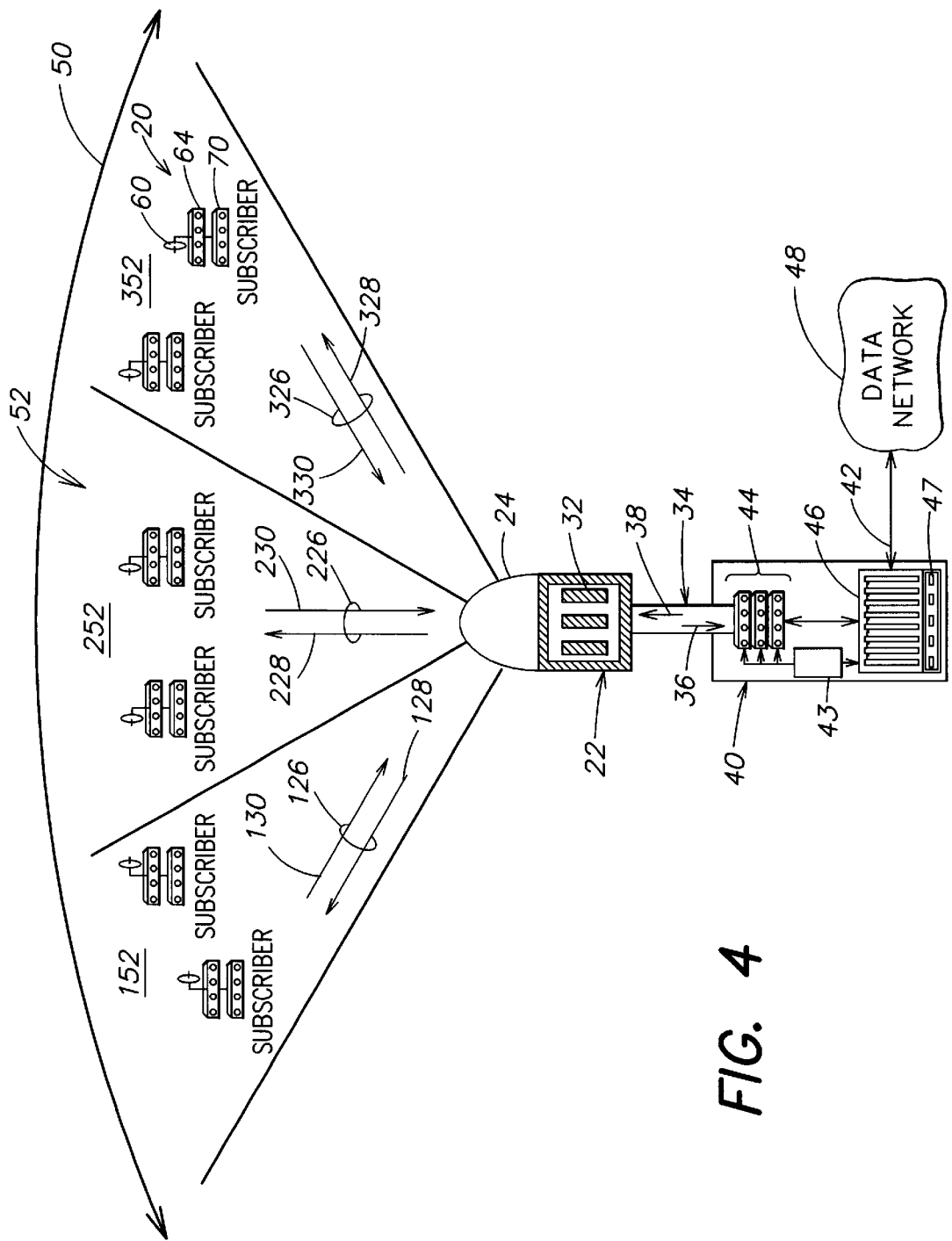
FIG. 4 is a more detailed diagram of the wireless communication system of FIG. 1C, illustrating a sectored coverage area according to one embodiment of the invention.

FIG. 4 is a more detailed diagram of the system illustrated in FIG. 1C, in which the base station 22 is shown transmitting data to and receiving data from several fixed subscriber stations 20. Each subscriber station 20 shown in FIG. 4 may be similar to that illustrated in FIG. 3, and may include a directional antenna 60, one or more subscriber transceivers 64, and one or more subscriber modems 70. In the system of FIG. 4, the fixed subscriber stations 20 are shown dispersed amongst a plurality of sectors 152, 252, and 352 within a coverage area 52 which is defined by an azimuth 50 around the base station 22. While FIG. 4 shows coverage area 52 spanning an azimuth 50 of less than 360° and being divided into only three sectors, the coverage area 52 may span an azimuth of up to 360° and may be divided into any number of sectors having various widths. The number of sectors into which a coverage area is divided may be limited by practical system design requirements, as discussed further below. Accordingly, it should be appreciated that the following discussion of the system of FIG. 4 is for purposes of illustration only, and applies to systems according to various embodiments of the invention having any number of sectors within a coverage area of up to 360°.

In the wireless communication system of FIG. 4, the base station 22 may transmit data to and receive data from the fixed subscriber stations 20 over an independent two-way broadband wireless communication link for each sector of coverage area 52 using a number of data carriers in each sector. For example, in FIG. 4, wireless communication links 126, 226, and 326 respectively correspond to the sectors 152, 252, and 352 of coverage area 52. Using at least two data carriers on each link 126, 226, and 326 for purposes of illustration, the antenna system 24 of the base station 22 is constructed and arranged to transmit and receive radiation over communication link 126 in sector 152 in the form of data carriers 128 and 130. Similarly, the antenna system 24 is constructed and arranged to transmit and receive radiation in the form of data carriers 228 and 230 over communication link 226 in sector 252, and data carriers 328 and 330 over communication link 326 in sector 352.

In a preferred embodiment of the invention, the base station 22 is capable of simultaneously transmitting, via the antenna system 24, data carriers in all sectors of the coverage area 52. Furthermore, in the preferred embodiment, a polarization of the data carriers transmitted and received by the antenna system 24 is the same for all sectors of the coverage area 52.

In FIG. 4, the data carriers of each independent wireless communication link 126, 226, and 326 may include one or more pairs of frequency channels. Preferably, one frequency channel of a pair is used to transport "downstream" data from the base station 22 to each of the fixed subscriber stations 20 in a given sector, while another frequency channel of the pair is used to transport "upstream" data from each of the fixed subscriber stations 20 in the given sector to the base station 22. For example, on communication link 126, frequency channel 128 is shown in FIG. 4 as transporting downstream data, while frequency channel 130 is shown as transporting upstream data. Similarly, FIG. 4 shows that frequency channels 228 and 328 may be used to transport downstream data from the base station 22 to each of the fixed subscriber stations located in sectors 252 and 352, respectively, while frequency channels 230 and 330 may be used to transport upstream data from each of the fixed subscriber stations of sectors 252 and 352, respectively, to the base station 22. For any wireless communication link, the frequency channels may be contiguous, or separated by approximately the bandwidth of each channel, or may be spaced farther apart within the spectrum designated for the communication link.

In a preferred embodiment of the invention, each frequency channel of the independent wireless communication links 126, 226, and 326 has a fixed carrier frequency during normal operation of the base station 22, and is used to transport data either to or from all of the fixed subscriber stations in a given sector. In particular, according to one embodiment, the frequency channels associated with a particular sector are not assignable to any one subscriber station within the sector. The non-assignable nature of the frequency channels in one embodiment of the present invention differs from dynamic frequency channel assignment and allocation schemes commonly used in wireless cellular networks for mobile subscribers, in which a number of frequency channels are available throughout a coverage area and dynamically assigned to a particular mobile subscriber on a per-connection basis, based upon noise and traffic conditions on the channels and the location of the mobile subscriber.

To increase the capacity of any one frequency channel used in the wireless communication system shown in FIG. 4, one or more pairs of frequency channels used in each sector of the coverage area 52 are preferably reused in another sector; specifically, at least one pair of frequency channels is the same for at least two sectors. Furthermore, while the frequency channels used in any given sector may or may not be contiguous, as discussed above, in the preferred embodiment of the invention contiguous sectors do not use the same pairs of frequency channels.

For example, in FIG. 4, according to a preferred embodiment of the invention, downstream channel 128 of sector 152 may have the same carrier frequency as downstream channel 328 of sector 352. Likewise, upstream channel 130 of sector 152 may have the same carrier frequency as upstream channel 330 of sector 352. While in the example described above, sectors 152 and 352 use the same frequency channels for transporting upstream and downstream data, respectively, frequency channels 226 and 228 of sector 252 would have carrier frequencies different from those of the channels used in sectors 152 and 352. Additionally, while in the preferred embodiment contiguous sectors of the coverage area do not use the same frequency channels, all of the frequency channels used in all of the sectors have the same polarization, as discussed above.

In the wireless communication system of FIG. 4, the base station 22 preferably includes at least one transceiver 32 for each sector of the coverage area 52. Accordingly, for purposes of illustration, FIG. 4 shows three transceivers 32, each transceiver corresponding to a respective sector 152, 252, and 352. Each transceiver 32 may include a discrete transmitter to transmit a downstream frequency channel and a discrete receiver to receive an upstream frequency channel, respectively, for each sector, or may be an integrated transceiver unit. While FIG. 4 shows only three transceivers corresponding to three sectors, more than one upstream or downstream frequency channel may be employed in any sector; hence, the base station 22 may include a dedicated transceiver for each upstream/downstream channel pair in a sector. Each transceiver 32 of the base station 22 may be coupled to the internal communication link 34.

Similarly, FIG. 4 illustrates that the network operation 40 may include one modem 44 for each sector of the coverage area 52. Accordingly, for purposes of illustration, FIG. 4 shows three modems 44, each modem corresponding to a respective sector 152, 252, and 352. In the system of FIG. 4, each modem 44 transmits data to and receives data from a respective transceiver 32 over the internal communication link 34, as discussed above in connection with FIG. 1C. If more than one upstream or downstream frequency channel is employed in any sector, the network operation center 40 may include a dedicated modem 44 for each upstream/downstream channel pair in a sector.

In the preferred embodiment of the invention, each modem 44 of the system shown in FIG. 4 transmits data to and receives data from a respective transceiver 32 over the internal communication link 34 using a unique pair of frequency channels, one channel of the pair to transport upstream data, and another channel of the pair to transport downstream data. For example, as discussed above in connection with FIG. 1C, the data carriers 36 and 38 of the internal communication link 34 may include one dedicated internal channel pair per modem 44. Accordingly, in the example system shown in FIG. 4 having three sectors and one transceiver/modem pair per sector, the internal communication link 34 would include three unique pairs of internal frequency channels, or six unique frequency channels. Each internal frequency channel pair may be associated with a respective "external" frequency channel pair of a wireless communication link in one of the sectors of the coverage area 52, via the conversion provided by one of the transceivers 32 of the base station 22.

It should be appreciated that while the internal communication link may include several unique frequency channels, at least some of the corresponding external frequency channels of the wireless communication links will have the same carrier frequency, according to one or more predetermined frequency reuse schemes, as discussed above. Additionally, the internal communication link 34 may include, or be formed by, at least two distinct media, for example two or more coaxial or fiber optic cables, two or more internal wireless communication links, or combinations thereof. For each distinct media, each second data carrier may have a unique carrier frequency in the second frequency range, while carrier frequencies amongst different media constituting the internal communication link 34 may be reused. For example, if the internal communication link 34 includes a first coaxial cable and a second coaxial cable, each of the first and second coaxial cables may transport a second data carrier having a carrier frequency of, for example, 10 MHz, but each second data carrier transported by one of the first and second coaxial cables would have a unique carrier frequency.

To transport data to and from each fixed subscriber station 20 in a sector served by at least one pair of frequency channels, in one embodiment of the invention each internal frequency channel (and hence each external frequency channel) may include a plurality of time periods, wherein at least one time period is assigned to each fixed subscriber station within the sector. Typically, such an assignment of time periods is accomplished by the modem 44 associated with the sector and is conventionally referred to as time division multiple access (TDMA). Each modem 44 may assign at least one time period of an upstream frequency channel and downstream frequency channel to each fixed subscriber station within a corresponding sector. It should be appreciated that while TDMA may be employed within one or more sectors, the base station may nevertheless transmit and receive data simultaneously and independently in two or more sectors; namely, while communication within a given sector may be multiplexed, communication amongst the sectors may be continuous.

The assignment of time periods by each modem 44 may in turn be controlled by a processor 43 of the network operation center 40. Each modem 44 may be capable of various communication protocols in which two or more time periods may be assigned to a particular fixed subscriber station within a sector. Furthermore, in a preferred embodiment of the invention, the processor 43 may control each modem 44 to dynamically assign an appropriate number of time periods to each fixed subscriber station within a sector based on a relative demand of the fixed subscriber stations within the sector, although other embodiments may use other criteria to dynamically assign time periods. For example, one fixed subscriber station in a given sector may be a business or multiple dwelling unit, including a number of individual businesses or residences as end-users, while another fixed subscriber station in the same sector may be a single family residence. In general, the former fixed subscriber station would require more capacity from the communication link dedicated to the sector than would the latter. Accordingly, the processor 43 and the corresponding modem 44 at the network operation center 40 would appropriately assign a number of time periods (for example, more time periods to the former subscriber station) in both the upstream and downstream frequency channels to accommodate the relative demands of the business or multiple dwelling unit and the single family residence.

Additionally, the processor 43 and the modems 44 may designate time periods in both the upstream and downstream frequency channels for a given sector that are not assigned to any particular fixed subscriber station in the sector, but instead may serve as "spacers" in a transported data stream. In particular, such non-assigned time periods may be set aside as "synchronization" periods in each frequency channel to account for differences in propagation distance from the base station 22 to each fixed subscriber station in a sector. Such differences in propagation distance may result in differences of frequency channel signal arrival times amongst the fixed subscriber stations in a sector, in connection with receiving data at either the base station or the fixed subscriber stations.

For example, if in a given sector a first fixed subscriber station is located 10 miles from the base station and a second fixed subscriber station is located 20 miles from the base station, a frequency channel transmitted by the base station will take approximately twice as long to arrive at the second station as it would to arrive at the first. Likewise, a frequency channel transmitted by the second subscriber station would take approximately twice as long to arrive at the base station than would a frequency channel transmitted by the first subscriber station. Accordingly, non-assigned time periods may be designated in a frequency channel by the processor 43 and/or one or more modems 44 for purposes of synchronization, or correcting timing differences, amongst fixed subscriber stations in a sector.

In another embodiment, data transported to and from each fixed subscriber station 20 in a sector served by at least one pair of frequency channels may be designated or assigned to a particular subscriber station using code division multiple access (CDMA). In CDMA, data associated with a particular subscriber station is modulated by, or correlated with, a unique digital reference code also associated with the particular subscriber station. Such correlation and associated decorrelation functions are typically accomplished by the modem 44 associated with the sector. Each subscriber modem 70 in the sector would correspondingly be capable of correlating and decorrelating data transmitted and received by each fixed subscriber station 20 with a respective unique digital reference code.

In CDMA, the result of correlating the data with a digital reference code resembles a random or noise-like signal for each fixed subscriber station, which is transmitted over one of the frequency channels in the sector together with other noise-like signals corresponding to uniquely correlated data associated with other subscriber stations in the sector. At each subscriber modem 70 in the sector, the frequency channel carrying the noise-like signals is demodulated and decorrelated with the respective digital reference codes to recover the data.

In the system of FIG. 4, the switching equipment 46 of the network operation center 40 may transport data between any one of the modems 44 and the data network 48. Additionally, switching equipment 46 may transport data between any two modems 44, so as to direct data between fixed subscriber stations in different sectors, or may receive data sent by a particular fixed subscriber station in a given sector via a respective modem, and direct data back to the same modem so that the data is transmitted to another fixed subscriber station in the same sector.

Additionally, as discussed above in connection with FIG. 1C, in one embodiment one or more of the fixed subscriber stations 20 dispersed throughout the coverage area 52 of the system shown in FIG. 4 may be a base station, similar to base station 22, for another wireless communication system according to the invention. The base station 22 in FIG. 4 may transmit data to and receive data from one or more other base stations within the coverage area 52 using the same data carriers of the independent wireless communication link associated with the sector in which the other base station is located, or using dedicated data carriers in a frequency range different from that of the wireless communication link associated with the sector. By coupling two or more base stations, two or more wireless communication systems according to the invention may be linked to form a wireless communication network backbone spanning two or more coverage areas. In another embodiment directed to coupling two or more base stations, one or more subscriber stations in a given sector may serve as either "relay stations" between two base stations, or alternatively as "common stations" for two or more base stations.

Figure 5:
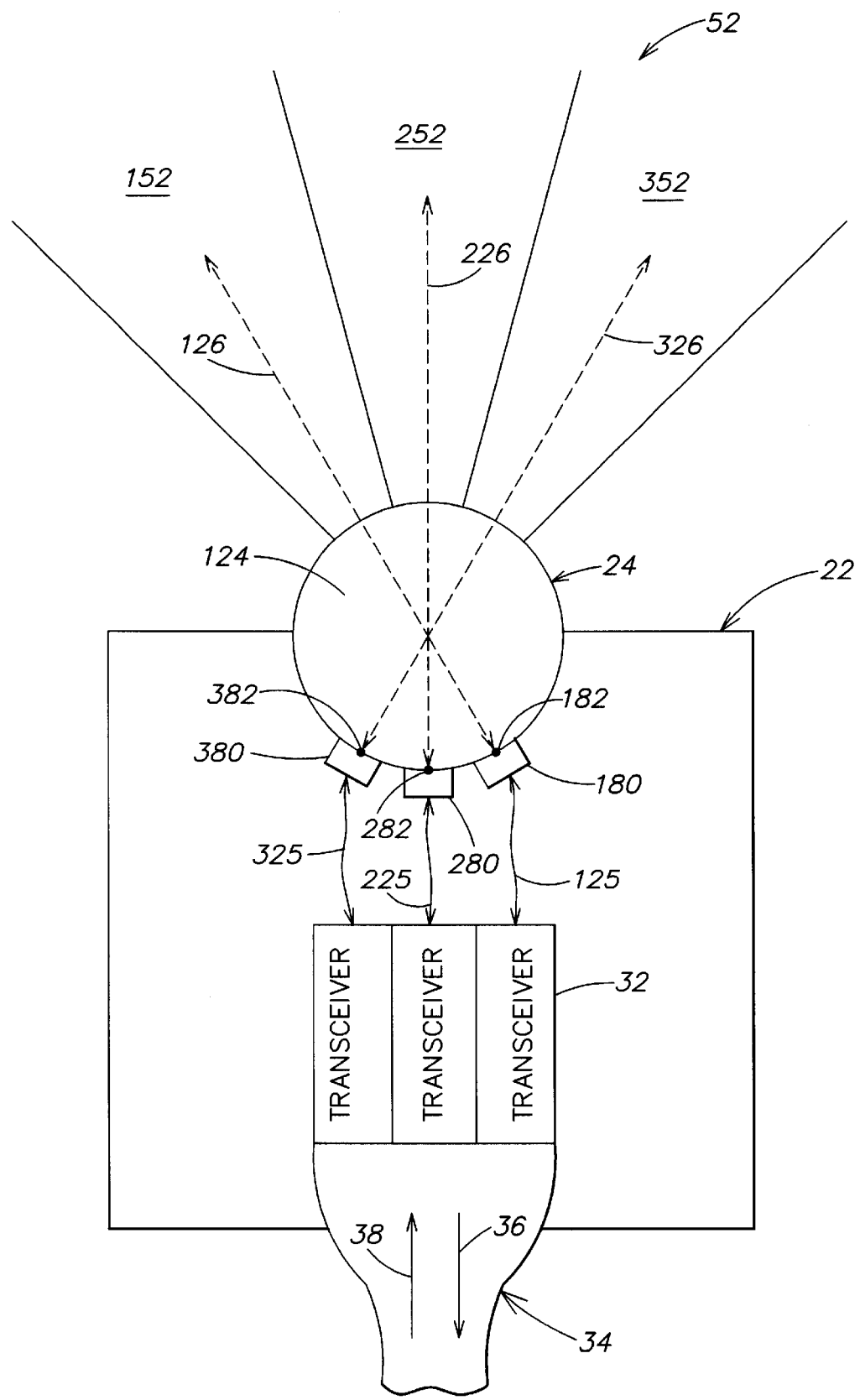
FIG. 5 is a schematic drawing of a base station of the system of FIG. 4, illustrating a lens-based sectored antenna system according to one embodiment of the invention.

FIG. 5 is a detailed diagram of the base station 22 of the system of FIG. 4, according to one embodiment of the invention. The base station 22 of FIG. 5 includes a lens-based sectored antenna system 24 to transmit and receive the data carriers used for the independent two-way broadband wireless communication links in each sector of the coverage area 52. One example of a lens-based antenna design suitable for purposes of the invention includes, but is not limited to, a Luneberg lens formed by multiple layers of dielectric materials having different dielectric constants. For purposes of illustration, as in FIG. 4, the coverage area 52 shown in FIG. 5 is divided into three sectors 152, 252, and 352, in which the independent wireless communication links 126, 226, and 326 respectively associated with each sector are shown symbolically as dashed lines.

The sectored antenna system 24 is constructed and arranged to emit a respective radiation pattern of transmitted data carriers in each sector of the coverage area 52 so that the data carriers reach all of the fixed subscriber stations located within each sector. In a preferred embodiment of the invention, the sectored antenna system 24 includes a dielectric lens 124 having one or more focal points, wherein each focal point corresponds to one sector of the coverage area 52. In FIG. 5, for purposes of illustration, three focal points 182, 282, and 382 are shown for the dielectric lens 124, corresponding to sectors 152, 252, and 352, respectively.

The sectored antenna system 24 of FIG. 5 additionally includes one or more feed devices, located proximate to each focal point, to transmit and/or receive the data carriers in each sector. For example, in FIG. 5, feed device 180 located at focal point 182 transmits and receives the data carriers used for communication link 126 in sector 152. Similarly, feed device 280 located at focal point 282 transmits and receives the data carriers used for communication link 226 in sector 252, and feed device 380 located at focal point 382 transmits and receives the data carriers used for communication link 326 in sector 352.

While FIG. 5 shows only one feed device to transmit and receive data carriers in each sector, one or more feed devices may be employed to transmit data carriers in each sector, while one or more other feed devices may be employed to receive data carriers in each sector. Examples of lens-based sectored antenna systems, including various feed device constructions and arrangements which are suitable for purposes of the invention, are described in three U.S. patent applications Ser. Nos. 08/677,413, 08/963,039, and 09/151,036, all of which are incorporated herein by reference.

The incorporated applications referenced above are directed to highly efficient sectored antenna systems which reduce sidelobe and backlobe radiation patterns of the data carriers transmitted in each sector. The improved radiation profiles of such sectored antenna systems reduce interference amongst different sectors, which in turn improves the overall performance of the system in view of a required signal-to-noise ratio (SNR) for a particular choice of data carrier modulation/demodulation technique, as discussed above in connection with FIG. 2. Additionally, such improved sectored antenna system allow for a 360° coverage area with an increased number of sectors, which in turn results in increased system capacity. Several engineering design considerations which effect system performance, and in particular design considerations which effect a choice of radiation patterns and sector widths to minimize interference and hence maximize capacity, are discussed in greater detail below in connection with FIGS. 7–17.

FIG. 5 also illustrates that the base station 22 may include one or more tunable transceivers 32 coupled between the feed devices of antenna system 24 and the internal communication link 34. As discussed above in connection with FIG. 4, each transceiver 32 converts data carriers received by the antenna system 24, from one of the independent wireless communication links 126, 226, and 326, to corresponding data carriers of the internal communication link 34. Similarly, each transceiver 32 converts data carriers from the internal communication link 34 to corresponding data carriers for transmission by the antenna system 24 over one of the independent wireless communication links 126, 226, and 326. Preferably, the base station 22 includes at least one transceiver 32 for each sector of coverage area 52.

In a preferred embodiment of the invention, the sectored antenna system 24 is located within close proximity of the transceivers 32 so as to minimize any possible signal attenuation. Each transceiver 32 may be coupled to one or more respective feed devices of the antenna system 24 using a low-loss connector. For example, in FIG. 5 the transceivers 32 are shown connected to feed devices 180, 280, and 380 using low-loss cables 125, 225 and 325, respectively, which may be coaxial cables having a short length. Other low-loss methods of connecting the transceivers 32 to the antenna system 24, such as one or more fiber optic cables, may be employed to facilitate a greater separation between the antenna system 24 and transceivers 32.

As discussed above in connection with FIG. 4, the transceivers 32 shown in FIG. 5 may each include a discrete transmitter and receiver component, or may be integrated as a single component transceiver. Additionally, each transceiver 32 may convert a pair of data carrier frequency channels for each sector (one channel for upstream data and one channel for downstream data) to internal frequency channels, or may convert multiple frequency channel pairs for each sector to internal frequency channels. Alternatively, as discussed above in connection with FIG. 1C, a number of transceivers 32 may be associated with each sector, for example, one transceiver for every frequency channel pair used in the sector.

During normal operation of the base station 22, the carrier frequencies of the frequency channels used for each independent wireless communication link preferably remain fixed. However, the transceivers 32 may be tunable, in that the carrier frequencies may be adjusted during calibration or set-up of the transceivers 32. In one embodiment of the invention, manual frequency channel adjustability of the transceivers 32 is accomplished through synthesized local oscillators and operator-selectable ceramic filters.

Preferably, both the base station transceivers 32 and subscriber transceivers 64 are designed for low-noise operation. Any noise contributed by the transceivers at either the base station or the fixed subscriber units must be factored in to an overall noise budget for each communication link of the system, as discussed in connection with FIGS. 2 and 7. Particular transceiver design considerations which affect link noise budgets and overall system performance are discussed further below, in connection with FIG. 16.

Figure 6:
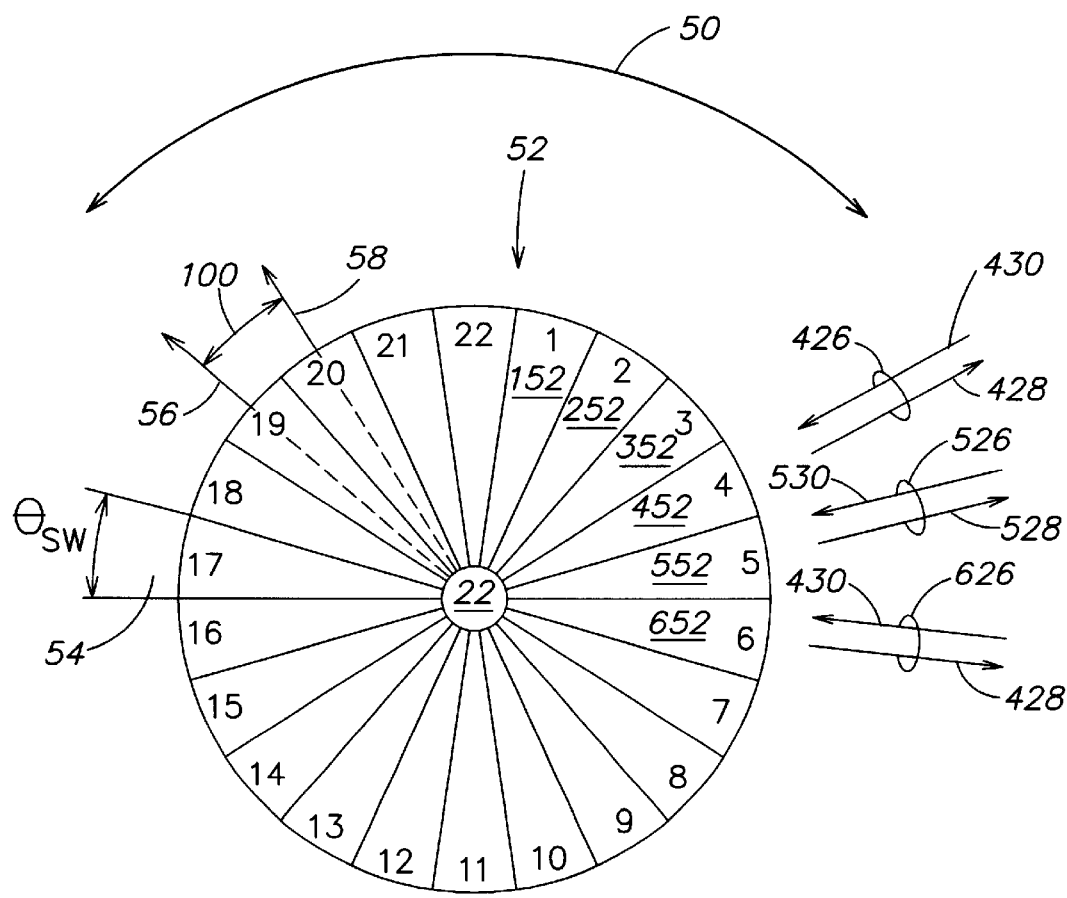
FIG. 6 is a diagram showing an example of a frequency reuse scheme in a 360° coverage area for the sectored antenna system of FIG. 5 according to one embodiment of the invention.

FIG. 6 is a diagram showing an example of a coverage area 52 of a sectored antenna system 24 which is designed to span an azimuth 50 of a full 360° around a base station 22 located at the center of the coverage area 52. In general, the coverage area 52 may be divided into a number of sectors which is divisible by the number of unique pairs of frequency channels employed by the wireless communication system according to the invention. In one embodiment, the coverage area 52 is divided into an even number of approximately pie-shaped contiguous sectors each having a substantially similar width. The relative position of a given sector around the coverage area 52 may be identified by a peak of a radiation pattern centered within the sector, as indicated in FIG. 6 by rays 56 and 58 for the sectors numbered 19 and 20, respectively. For the coverage area shown in FIG. 6, the respective peaks of radiation patterns in any two sectors are separated by an angular distance, or azimuth 100. For example, FIG. 6 shows that the ray 56 and 58 of the contiguous sectors numbered 19 and 20, respectively, are separated by azimuth 100. If the coverage area 52 is divided equally into a number of sectors, each covering approximately the same area, the azimuth 100 between any two contiguous sectors also represents the sector width 54, given by the azimuth $\theta_{sw}$, as indicated in FIG. 6 for the sector numbered 17.

In a preferred embodiment of the invention, the coverage area 52 is divided into 22 approximately pie-shaped sectors each having the same sector width $\theta_{sw}$. For purposes of illustration, the sectors in FIG. 6 are sequentially numbered from 1 to 22; the sectors designated by reference characters 152, 252, 352, 452, and so on, correspond to the pie-shaped sectors numbered 1, 2, 3, 4, and so on, respectively. While in FIG. 6 each sector of the coverage area 52 is shown as pie-shaped, each sector may have an arbitrary shape. In practice, the outline of the radiation pattern designated for each sector may have some curvature. Additionally, the radiation pattern designated for each sector may overlap the geographic area of one or more neighboring sectors. Accordingly, it should be appreciated that while sectors are referred to for purposes of the invention as non-overlapping geographic areas, one radiation pattern designated for a given sector may overlap with another radiation pattern designated for another sector. A method according to the invention for determining an optimum sector distribution within a coverage area, and in particular a preferred sector width $\theta_{sw}$ and hence a preferred number of sectors per a particular coverage area azimuth 50, is discussed further below in connection with FIGS. 8–15.

In FIG. 6, each sector of coverage area 52 preferably includes at least one independent two-way broadband wireless communication link to transmit data to and receive data from the fixed subscriber stations located in the sector, as discussed above in connection with FIGS. 4 and 5. For example, as shown in FIG. 6, independent two-way broadband wireless communication links 426, 526, and 626 are associated with sectors 452, 552, and 652, corresponding to the sequentially numbered pie-shaped sectors 4, 5, and 6, respectively.

In a preferred embodiment of the invention, alternate sectors of the coverage area 52 shown in FIG. 6 use the same frequency channels for their respective independent wireless communication links. For example, one or more first pairs of frequency channels may be used to transport data in even-numbered sectors of coverage area 52, while one or more second pairs of frequency channels, different from the first pairs, may be used to transport data in odd-numbered sectors of coverage area 52.

In particular, FIG. 6 shows that sectors 452 and 652 each use frequency channel 430 for upstream data and frequency channel 428 for downstream data over the independent wireless communication links 426 and 626, respectively. In contrast, sector 552 uses frequency channel 530 for upstream data and frequency channel 528 for downstream data over independent wireless communication link 526. Similarly, while not shown explicitly in FIG. 6, in one example of an alternate sector frequency reuse scheme according to the invention, each of the even-numbered sectors would use frequency channel 430 for upstream data and frequency channel 428 for downstream data over their respective independent wireless communication links. Likewise, each odd numbered sector would use frequency channel 530 for upstream data and frequency channel 528 for downstream data over their respective independent wireless communication links. One example of frequency channel carrier frequencies in the MMDS spectrum suitable for purposes of the invention includes, but is not limited to, 2.665 GHz for upstream channel 430 and 2.503 GHz for downstream channel 428, and 2.659 GHz for upstream channel 530 and 2.509 GHz for downstream channel 528.

In one embodiment of the alternate sector frequency reuse scheme illustrated in FIG. 6, only two different pairs of frequency channels are required throughout the coverage area 52, one pair for all of the even-numbered sectors, and another pair for all of the odd-numbered sectors. By reusing a frequency channel amongst a number of sectors, the data capacity of the frequency channel in a given coverage area is essentially multiplied by the number of sectors in which the frequency channel is used. It should be appreciated, however, that while in the preferred embodiment only one frequency channel pair is used for each sector in FIG. 6, a plurality of channel pairs may be used for each sector, as well as different reuse plans amongst the sectors. Indeed, a completely customized frequency reuse plan, for example frequency reuse in every third or fourth or fifth sector, etc., or frequency reuse in only particular arbitrarily designated sectors, may be implemented according to other embodiments to suit a highly customized system.

As discussed above in connection with FIGS. 1C and 2, the choice of modulation/demodulation technique used by any one of the modems 44 of the network operation center 40, as well as the subscriber modems 70 of the fixed subscriber stations 20, to encode and decode the frequency channels of the wireless communication links throughout the coverage area determines a minimum signal-to-noise ratio (SNR) requirement for the communication links. In a preferred embodiment of the invention, each two-way communication link of the system has an upstream data frequency channel and a downstream data frequency channel, and is associated with one modem 44 at the network operation center 40 and at least one subscriber modem 70 at a fixed subscriber station 20, which serve as terminations for the given communication link. Between the two modem terminations of any given communication link, potential sources of noise along the link may contribute to a "noise budget" that is limited by the SNR requirements of the modems to insure reliable, virtually error-free data transport over the link, for example a data error rate of 10 E-6 symbols/second or lower. A primary engineering design consideration of a wireless communication system according to the invention is to insure that all potential sources of noise along any communication link in the system are minimized so that the noise budget for any link is not exceeded.

Figure 7:
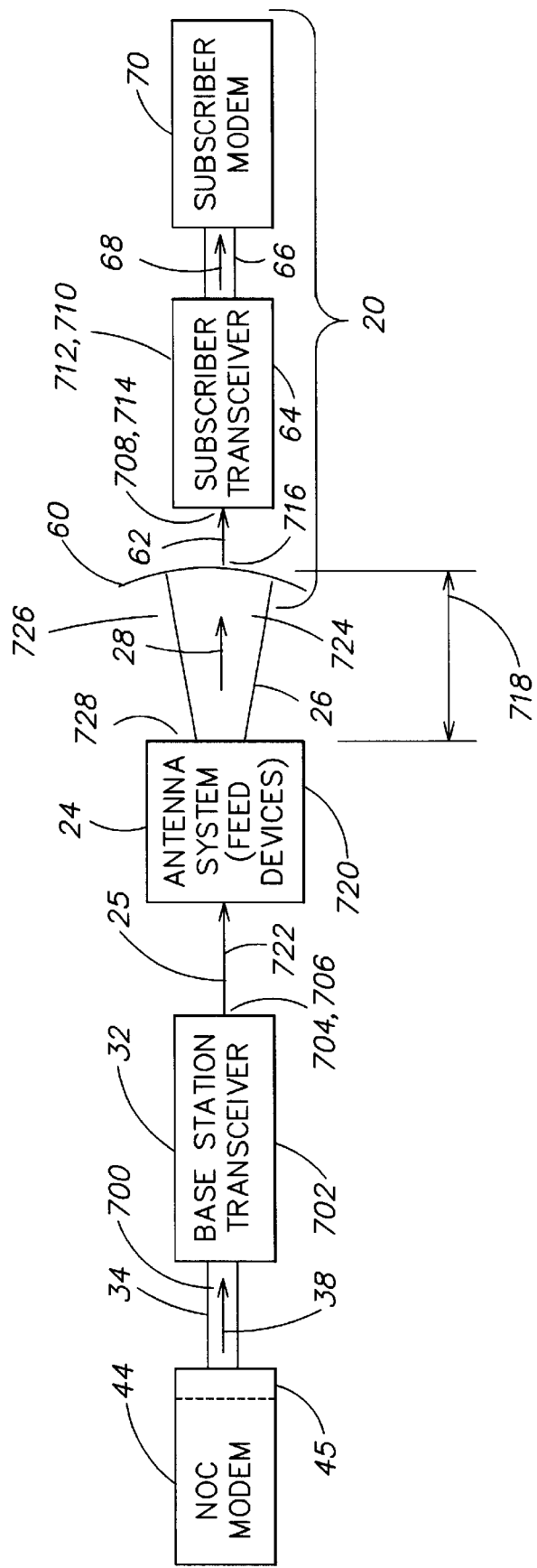
FIG. 7 is a diagram showing an example of one communication link of the system of FIG. 4.

FIG. 7 shows an example of a downstream data portion (base station to subscriber station) of one communication link of the system shown in FIG. 4, which for purposes of illustration is shown in FIG. 7 as originating from a modem 44 at the network operation center 40, and terminating at a subscriber modem 70. The downstream data is transported across the communication link shown in FIG. 7 via a succession of frequency channels 38, 28, and 68, which may have different carrier frequencies but typically have similar bandwidths.

Potential sources of noise along the communication link illustrated in FIG. 7 may include: 1) noise contributed by any link interface 45, such as an IF, RF, or optical transmitter, that may be employed by modem 44 to transmit the frequency channel 38 across internal communication link 34; 2) environmental disturbances that affect the internal communication link 34; 3) noise contributed by the transmit circuitry of the base station transceiver 32; 4) environmental disturbances that affect the link 25 between the transceiver 32 and the antenna system 24; 5) sidelobes and backlobes of radiation patterns emitted by the antenna system 24 in other neighboring sectors which use frequency channel 28 (which therefore interfere with the wireless communication link 26 also using frequency channel 28); 6) environmental disturbances that effect the link 62 between the directional antenna 60 of the fixed subscriber station 20 and the subscriber transceiver 64; 7) noise contributed by the receive circuitry of the subscriber transceiver 64; and 8) environmental disturbances that affect the internal subscriber communication link 66.

From the foregoing list of potential noise sources, in general the largest contributing source to the overall noise budget of the communication link shown in FIG. 7 is the undesired signal level in the wireless communication link 26 due to interference from other sectors in the coverage area that use the same frequency channel 28. Accordingly, a discussion of wireless communication system designs according to the invention which minimize contributions to a limited noise budget should first address any factors which may influence such interference from neighboring sectors using the same frequency channel.

The radiation pattern emitted by the feed devices of antenna system 24 associated with any one sector of a coverage area may present a source of interference in a number of other sectors within the coverage area, particularly those sectors which use one or more same frequency channels. Different sectored antenna system designs result in different radiation patterns, and achieve different degrees of isolation between sectors, as discussed in U.S. patent applications Ser. Nos. 08/963,039 and 09/151,036, referenced above. For any given radiation pattern, however, the amount of undesired signal level in a sector is typically a function of the various signal powers radiated by the antenna system, as well as the sector width $\theta_{sw}$, which ultimately determines the proximity of potential sources of interference.

In view of the foregoing, at least one advantage provided by the present invention includes a method for determining an optimum sector distribution within a coverage area, and in particular, an optimum sector width $\theta_{sw}$ given a radiation pattern for each sector. According to the method of the invention, a sector width $\theta_{sw}$ may be determined which minimizes the undesired signal level while maintaining a sufficiently uniform distribution of the desired signal level in each sector. For each frequency channel used in a sector, a ratio of the desired-to-undesired signal level, or D/U ratio, may be evaluated as a function of the sector width $\theta_{sw}$. In a preferred embodiment, the method of the invention determines an optimal sector width $\theta_{sw}$ which maximizes the D/U ratio for each sector, based on a given radiation pattern. Conversely, in other embodiments, the method of the invention may be implemented to determine an optimum radiation pattern, given a sector width, which maximizes the D/U ratio for each sector. The various embodiments of such a method according to the invention may be implemented using software, for example, in the form of a simulation program.

Figure 8:
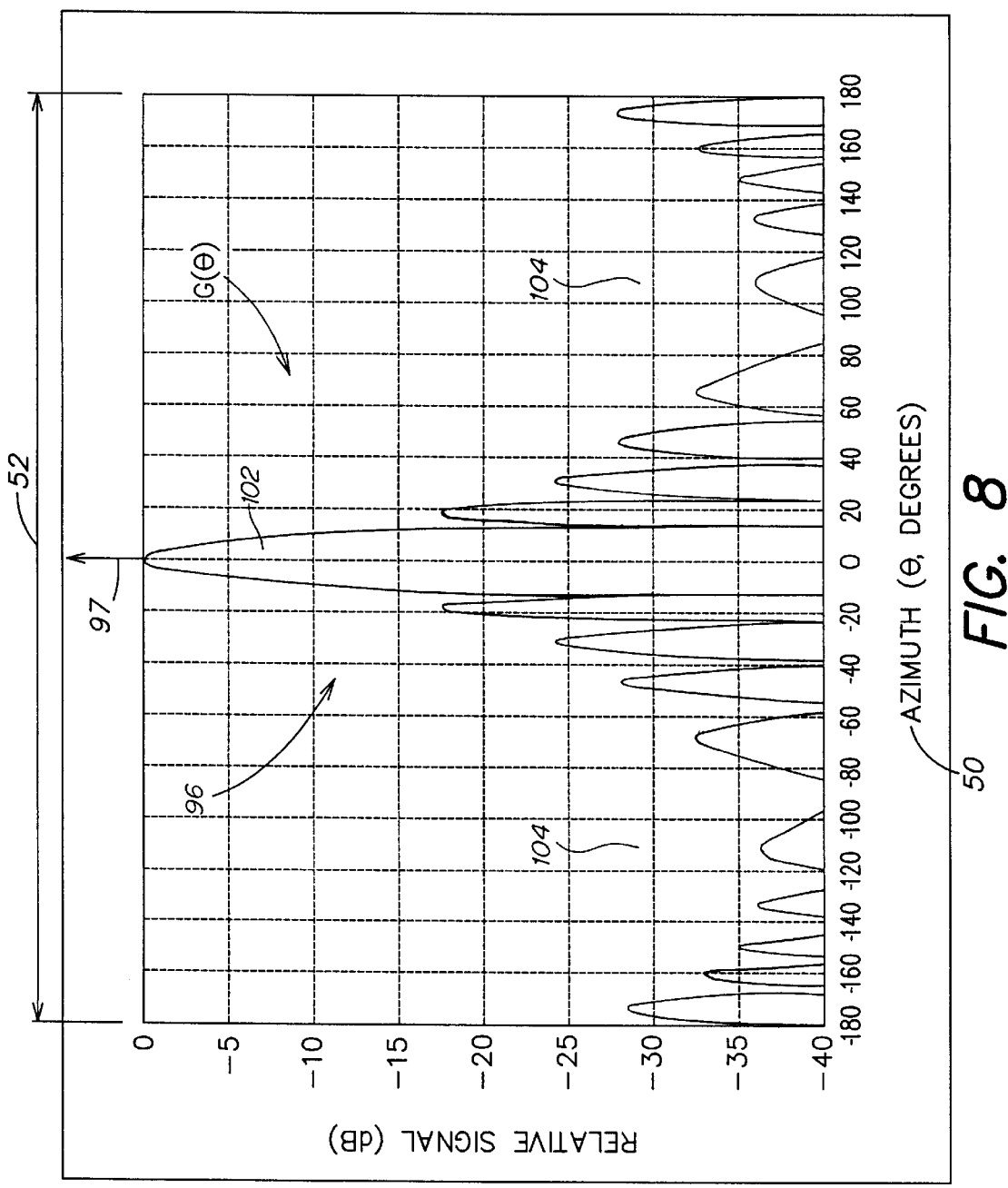
FIG. 8 is a graph showing an example of an antenna radiation pattern for one sector of a coverage area according to one embodiment of the invention.

FIG. 8 shows a plot of an example of an antenna radiation pattern 96 emitted by one or more feed devices associated with one frequency channel of a particular sector of a coverage area. The radiation pattern 96 represents the geographic area which a frequency channel transmitted by the feed devices covers, and the relative signal strength of the frequency channel throughout this area. As discussed above in connection with FIG. 6, while a sector designates a fixed geographic area that does not overlap with any other area, in which subscriber stations preferably receive one or more frequency channels specifically designated for the sector, FIG. 8 shows that a radiation pattern 96 designated for a particular sector may indeed span a geographic area larger than that corresponding to the sector.

In general, a radiation pattern emitted into a sector of a coverage area represents a far-field pattern $G(\theta)$ which can be measured or predicted. Alternatively, the pattern $G(\theta)$ may be a transform of a near-field radiation profile generated by one or more feed devices through one or more apertures in the dielectric lens 124 of the antenna system 24 shown in FIG. 5. Accordingly, different radiation patterns are possible, depending in part on the type of feed devices used, the spatial relationship between one or more feed devices and one or more apertures, and the physical properties of the dielectric lens 124. These topics are discussed in greater detail in U.S. patent applications, Ser. Nos. 08/963,039 and 09/151,036, incorporated herein.

As seen in FIG. 8, a radiation pattern $G(\theta)$ associated with one sector may span an entire 360° azimuth. In FIG. 8, the horizontal axis indicates the azimuth 50 within a 360° coverage area given by an angle $\theta$ in degrees, while the vertical axis indicates relative signal level in decibels (dB). The radiation pattern 96 of FIG. 8 includes a main lobe 102 having a peak 97, used as a reference for relative signal level (0 dB) and shown for purposes of illustration as coinciding with a 0° reference position. The radiation pattern 96 of FIG. 8 also includes a number of secondary sidelobes 104, which are distributed throughout the entire 360° coverage area.

While the main lobe 102 shown in FIG. 8 is intended to cover the geographic area associated with one sector of the coverage area 52, both the main lobe 102 and the sidelobes 104 may contribute undesired signals in other sectors of the coverage area, particularly those sectors which use the same frequency channel as radiation pattern 96. In the following discussion, first the interference due to the main lobe 102 of a given sector in neighboring same frequency channel sectors as a function of sector width $\theta_{sw}$ is considered qualitatively, followed by a more comprehensive quantitative analysis of the interference as a function of sector width $\theta_{sw}$ due to both the main lobe 102 and the sidelobes 104 of a given sector in all other sectors of the coverage area using the same frequency channel.

Figure 9:
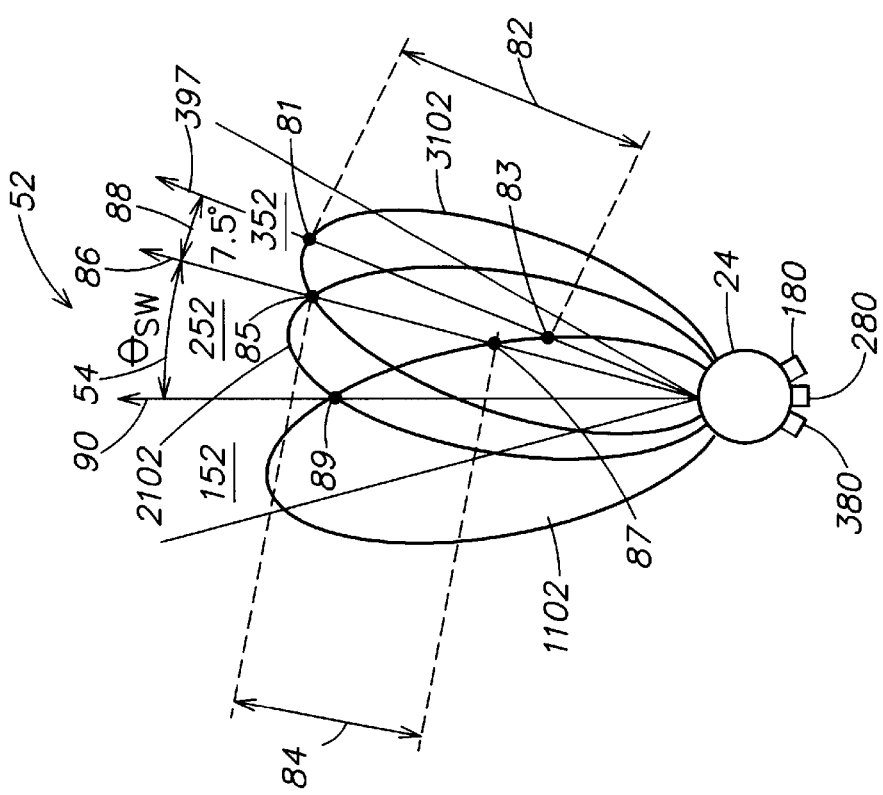

FIG. 9 is a diagram showing the approximate main lobe profiles of radiation patterns emitted by the devices 180, 280, and 380 of the sectored antenna system 24. In FIG. 9, main lobe 1102, which covers primarily sector 152, corresponds to feed device 180. Likewise, main lobe 2102, which covers primarily sector 252, corresponds to feed device 280, and main lobe 3102, which covers primarily sector 352, corresponds to feed device 380. It is assumed for purposes of the following discussion that the radiation patterns, and hence the main lobes 1102, 2102, and 3102, generated by each of the feed devices 180, 280, and 380 have essentially identical spatial profiles, although other embodiments may not require this.

In FIG. 9, the sector width 54 of each sector 152, 252, and 352 is given by the angle $\theta_{sw}$ between points of intersection of adjacent main lobes. For example, ray 90 passes through the point of intersection 89 between main lobes 1102 and 2102. Similarly, ray 86 passes through the point of intersection 85 between main lobes 2102 and 3102. Accordingly, the sector width 54 is shown in FIG. 9 as the angle $\theta_{sw}$ between ray 90 and ray 86. Like the profiles of the main lobes 1102, 2102, and 3102, the sector width $\theta_{sw}$ for each of sectors 152, 252, and 352 is assumed to be equal in FIG. 9, although other embodiments may not require this.

Also shown in FIG. 9 is ray 397, which denotes the peak 81 of the main lobe 3102 in sector 352. In a manner similar to that denoted by ray 97 of FIG. 8 for the main lobe 102 of radiation pattern 96, ray 397 may serve as a reference position at the center of sector 352. The angle 88 between ray 397 and ray 86 represents the half-width of sector 352, which is shown for example in FIG. 9 as approximately 7.5°. Accordingly, the width of each sector 152, 252, and 352 in the example of FIG. 9 is approximately 15°. It should be appreciated that the width of any given sector, as defined in FIG. 9, is not necessarily related to the profile of a main lobe of a radiation pattern; rather, as discussed above, for purposes of the present discussion, the sector width is defined by the angle between points of intersection of the main lobes in adjacent sectors.

Figure 10:
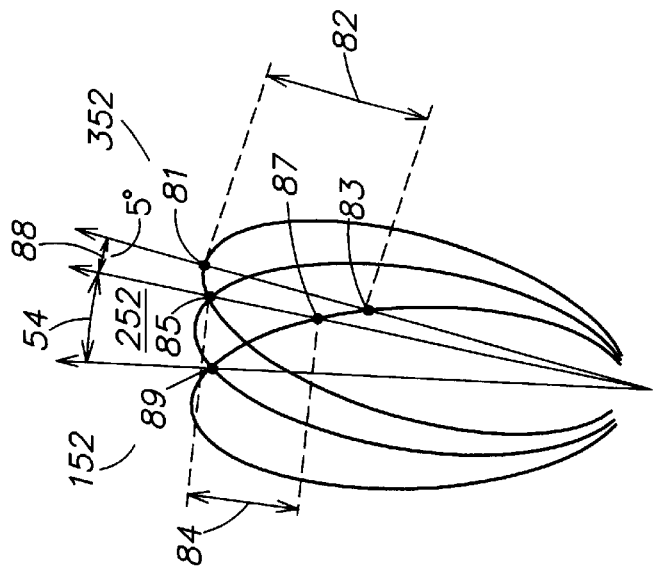
FIGS. 9 and 10 are diagrams showing the main lobes of antenna radiation patterns similar to the pattern of FIG. 8 for three contiguous sectors of a coverage area, comparing two different sector widths.

FIG. 10 is a diagram similar to that of FIG. 9 showing the same main lobe profiles for each of sectors 152, 252, and 352. However, in FIG. 10 the half-width 88 of each sector has been reduced to 5°. Accordingly, the sector width 54 has been reduced from 15° in FIG. 9 to 10° in FIG. 10.

As can be seen from a comparison of FIGS. 9 and 10, for a given radiation pattern and hence, for a given main lobe spatial profile, the degree of overlapping of neighboring main lobes is a function of the choice of sector width 54. Accordingly, smaller sector widths 54 result in a greater degree of overlapping of main lobes and, conversely, large sector widths 54 result in a smaller degree of overlapping. Since it is this overlapping of main lobes that serves as one source of interference in neighboring same frequency channel sectors, smaller sector widths 54 and hence a higher degree of overlapping of main lobes generally results in a higher degree of interference or undesired signal in neighboring sectors. However, smaller sector widths generally result in a more uniform distribution of desired signal level in each sector. Accordingly, the objectives of reduced interference and increased uniformity are preferably balanced in a determination of optimum sector width, as discussed further below.

Conversely, if the sector width 54 is fixed, a smaller or greater degree of overlapping may be achieved by varying the radiation pattern for each sector, and hence, narrowing or widening the profile of the main lobe. As discussed above in connection with FIG. 8, various radiation patterns may be suitable for purposes of the invention and are functions of the construction and arrangement of the sectored antenna system 24. Accordingly, while the following discussion focuses on determining an optimal sector width $\theta_{sw}$ for a given radiation pattern, it should be appreciated that both sector width and radiation pattern are variables that may affect D/U ratios, and an optimum radiation pattern may be determined for a fixed sector width to minimize interference amongst sectors while maintaining desired signal uniformity in each sector.

According to one embodiment of the invention, contiguous sectors of coverage area 52 do not use the same frequency channels to transport data. In particular, as discussed above in connection with FIG. 6, in a preferred embodiment of the invention alternate sectors of coverage area 52 use the same frequency channels to transport data. Applying such a frequency reuse scheme to the example of FIG. 9, it is assumed that sectors 152 and 352 use the same frequency channels to transport data. Accordingly, the following discussion focuses on the interference in sector 352 due to main lobe 1102 (and applies equally to the interference in sector 152 due to main lobe 3102).

In FIG. 9, any fixed subscriber stations in sector 352 located along ray 397, which passes through the peak 81 of main lobe 3102, receive the maximum signal level of the frequency channels transmitted in sector 352. Point 83 on ray 397 represents the radiation signal level due to the main lobe 1102 of sector 152 along ray 397. Since it is assumed that sector 152 uses the same frequency channels as sector 352 in this example, the point 83 represents the undesired signal level from sector 152 in sector 352 along the ray 397. Accordingly, the length of line 82 represents the difference in same frequency channel signal level along ray 397, and hence, the most favorable or maximum D/U ratio in sector 352.

Similarly, in FIG. 9 ray 86 passes through point 85 at the intersection of main lobes 2102 and 3102. In the example of FIG. 9, lobes 2102 and 3102 are associated with different frequency channels, used in contiguous sectors 252 and 352, respectively. Fixed subscriber stations located along ray 86 are on a boundary between sectors 252 and 352, and may choose to transmit and receive data on the frequency channels designated for either sectors 252 or 352. However, for purposes of this discussion, it is assumed that fixed subscriber stations located along ray 86 choose to transmit and receive data using the frequency channels designated for sector 352. As can be seen in FIG. 9, fixed subscriber stations located along ray 86 at the boundary of sector 352 receive the minimum desired signal level in that sector.

The point 87 in FIG. 9 indicates the radiation signal level of main lobe 1102 of sector 152 along the ray 86. Since it is assumed that main lobe 1102 and main lobe 3102 represent radiation patterns of the same frequency channels in this example, and since it is assumed that fixed subscriber stations located along ray 86 use the frequency channels designated for sector 352, the point 87 represents the undesired signal level for fixed subscriber stations located at the boundary of sector 352 along the ray 86. Accordingly, the length of line 84 represents the least favorable D/U ratio for sector 352.

The effect on maximum and minimum D/U ratios in each sector as a function of the sector width 54 is qualitatively indicated in FIG. 10 by the relative lengths of lines 82 and 84. From FIG. 10, in which the sector width 54 is reduced from that of FIG. 9, it can be seen that the maximum D/U ratio represented by the length of line 82 is reduced from that of FIG. 9. Similarly, the minimum D/U ratio represented by the length of line 84 is reduce from that of FIG. 9. The result in FIG. 10 suggests that, given a radiation pattern for each sector, there is some minimum sector width beyond which further reductions in sector width result in an undesirable reduction in both maximum and minimum D/U ratio for each sector.

Figure 11:
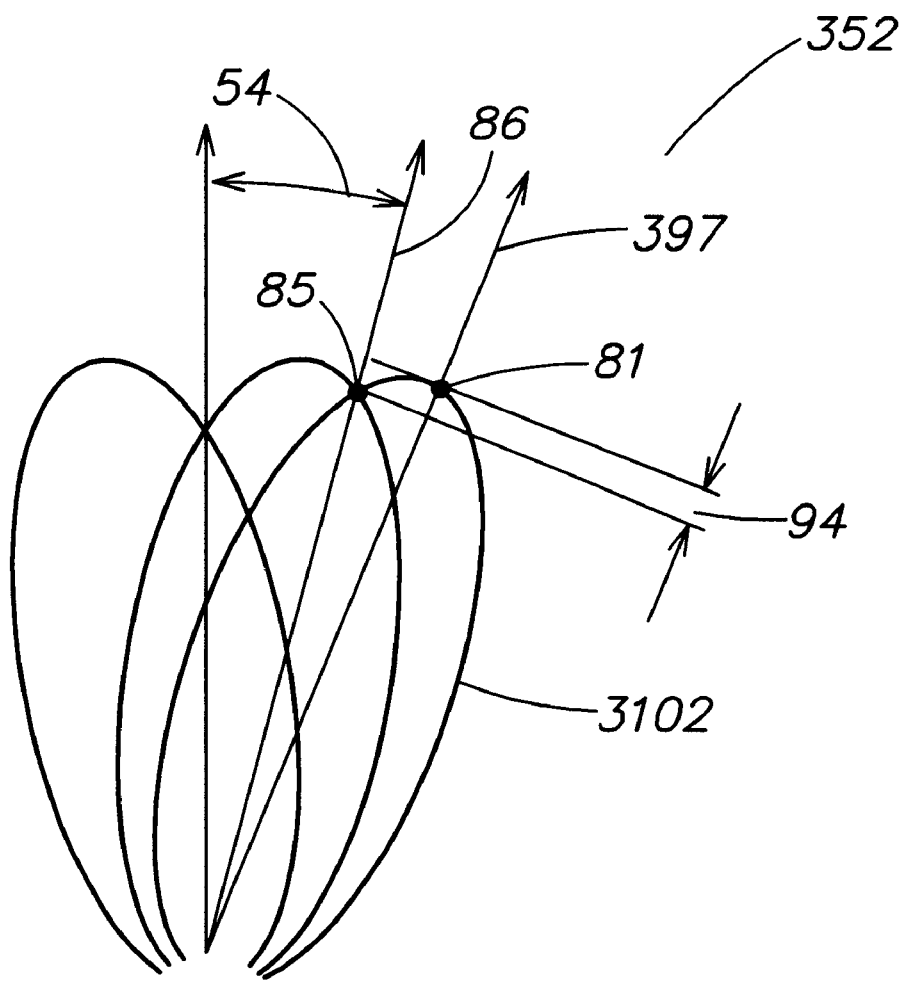
FIG. 11 is a diagram similar to FIGS. 9 and 10, showing a variation of desired signal level within one sector of a coverage area for a given sector width.

Conversely, if the sector width is increased in an effort to reduce interference from neighboring sectors, the variation of desired signal levels across a given sector may become excessive. This effect is undesirable, since it is preferred that all fixed subscriber stations in a sector receive approximately the same signal level for each frequency channel, and hence, receive reliable service from anywhere in the sector. FIG. 11 shows the difference in radiation signal levels between the peak 81 of main lobe 3102 for fixed subscriber stations located along ray 397 in the center of sector 352, and signal levels at the intersection point 85 for subscribers located along ray 86 at the boundary of sector 352. The difference in radiation signal level between these two locations is qualitatively illustrated by the length of line 94. As the sector width is increased for a given radiation pattern, the length of line 94 increases, indicating a higher variation of radiation levels throughout sector 352.

More specifically, some minimum desired signal level is required by subscriber stations located at or near a sector boundary, as indicated for example in FIG. 11 by point 85 along ray 86 for sector 352. Increasing the sector width may reduce the desired signal level at the boundary to an inoperable level below the minimum requirement. In general, since the desired signal level at a sector boundary decreases more rapidly than the undesired signal level with increased sector width, a less favorable minimum D/U ratio at the sector boundary results with increased sector width.

In sum, increasing sector width, or alternatively narrowing the profile of a main lobe of a radiation pattern with respect to sector width, reduces interference from nearby same frequency channel sectors but at the expense of increasing variation of radiation levels across a sector and decreasing D/U ratio at or near a sector boundary. Accordingly, any method of determining an optimum sector width or radiation pattern to maximize D/U ratio should take these competing effects into consideration, and aim to maximize D/U ratio while maintaining sufficient signal uniformity throughout a sector.

While the foregoing discussion of D/U ratios was focused primarily on interference from the main lobes of neighboring sectors using the same frequency channels, in practice the entire radiation pattern from all sectors within a coverage area, and specifically those sectors using one or more same frequency channels, should be considered for an accurate determination of D/U ratio in any one sector. In particular, as discussed above in connection with FIG. 8, the radiation pattern 96 associated with a given sector may include several sidelobes 104 in addition to main lobe 102, which indicate that the frequency channels designated for a particular sector may actually radiate some signal throughout the entire coverage area 52. Accordingly, the method of the invention for determining an optimum sector distribution within a coverage area evaluates the interference in a given sector due to both neighboring main lobes as well as sidelobes from all other sectors within the coverage area using the same frequency channels.

Figure 12:
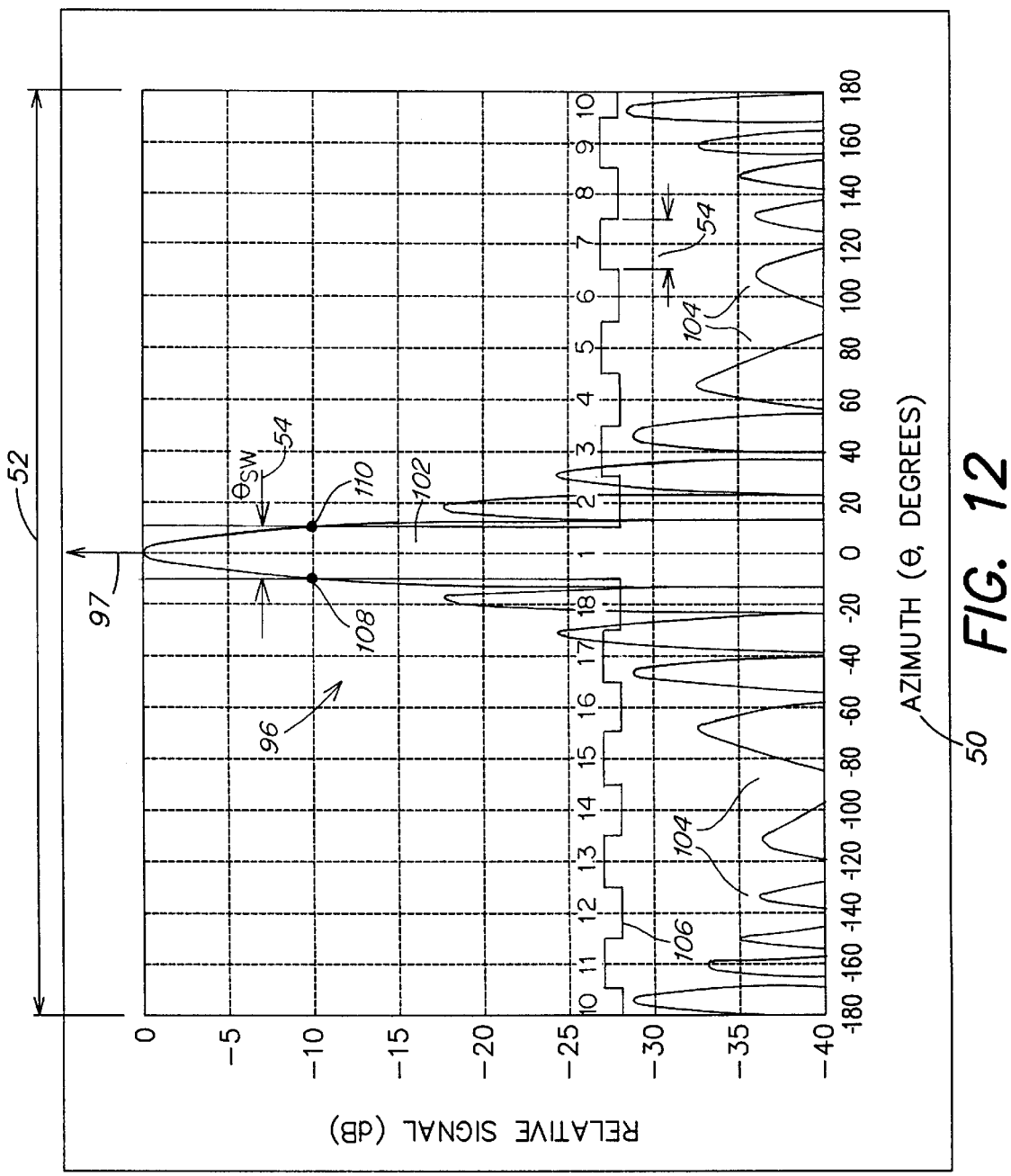
FIG. 12 is a graph showing an example of a distribution of sectors within a coverage area, superimposed on a plot of the radiation pattern of FIG. 8.

FIG. 12 shows an example of one possible sector distribution within a coverage area 52, superimposed on a plot of the radiation pattern 96 of FIG. 8. In the graph of FIG. 12, the boundaries of each sector are indicated by the alternating plot 106. For purposes of illustration, each sector is initially chosen to have a sector width 54 of $\theta_{sw}=20°$, resulting in a total of 18 sectors in a 360° coverage area. In the example sector distribution of FIG. 12 the sector width $\theta_{sw}$ is chosen to be approximately equal to the width of the main lobe 102 at the −10 dB points 108 and 110, but other choices of sector width are suitable for purposes of various embodiments of the method according to the invention. In general, however, it is assumed for purposes of the present discussion that any candidate sector width $\theta_{sw}$ results in a whole number of sectors within a coverage area spanning 360°. Furthermore, in the preferred embodiment of the invention in which alternate sectors use the same frequency channels, it is assumed that any candidate sector width $\theta_{sw}$ results in an even number of sectors within the coverage area. It should be appreciated, however, that the coverage area may span less than 360°, and that the coverage area may be divided into an arbitrary number of sectors having a variety of sector widths.

In FIG. 12, the peak of main lobe 102, indicated by ray 97, is shown centered in the sector numbered 1 at a 0° reference position. Sector 1 therefore has boundaries indicated at ±10° on the horizontal axis of FIG. 12. From sector 1, the sectors are sequentially numbered left to right, or "clockwise" from 2 through 10, up to the right-most portion of FIG. 12 labeled at +180°. The sequential numbering of the sectors continues on the left-most side of FIG. 12, with sector 10 at −180°, and continues through to sector 18, which is centered at an azimuth of −20° from the reference position.

As can be seen in FIG. 12, each sector includes a portion of radiation pattern 96 resulting from the sidelobes 104. From FIG. 12, it can also be seen that for different values of sector width $\theta_{sw}$, different sidelobes 104 may fall within the boundaries of each sector; hence, as discussed above, the interference in a given sector due to sidelobes associated with a given radiation pattern is a function of the sector width $\theta_{sw}$.

Figure 13:
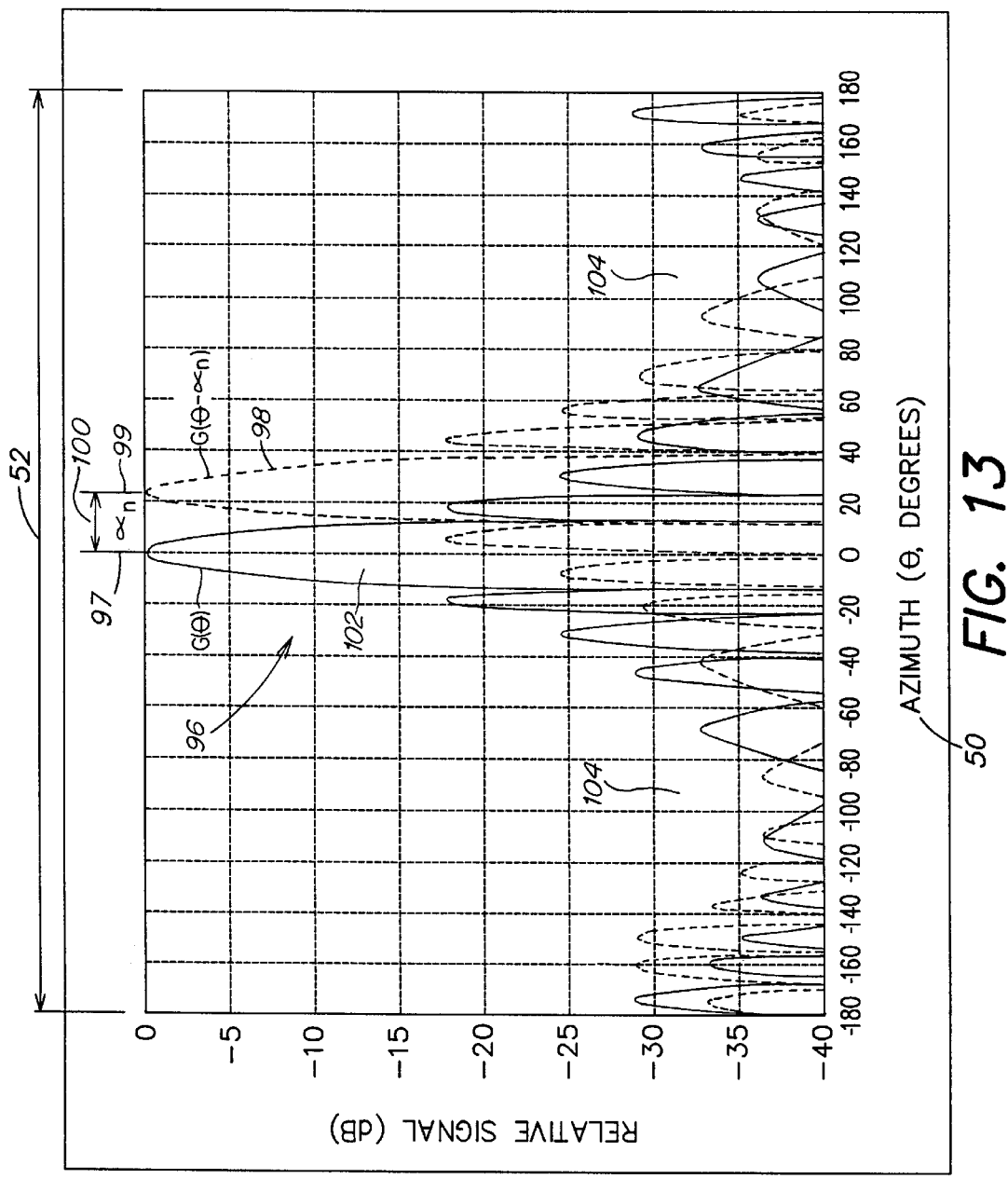
FIG. 13 is a graph showing two identical radiation patterns as in FIG. 8, respectively associated with two different sectors of a coverage area.

FIG. 13 is a graph showing plots of two identical radiation patterns 96 and 98 for two respective sectors of the coverage area 52. As in FIG. 12, it is assumed that radiation pattern 96 corresponds to the sector numbered 1, centered at a 0° reference position, and may be represented by the function $G(\theta)$, as in FIG. 8. A peak of the main lobe of radiation pattern 98, centered in some other sector n, is indicated by ray 99 and is shown shifted from the peak of the main lobe 102 in sector 1 by an angle 100, given by $\alpha_n$. Accordingly, the radiation profile 98 for sector n may be represented by the function $G_n = G(\theta - \alpha_n)$, which is merely the profile $G(\theta)$ shifted by an angle $\alpha_n$ from the 0° reference position.

It is assumed for purposes of the following discussion that in all sectors n of the coverage area 52, the antenna system simultaneously transmits radiation patterns having substantially identical spatial profiles similar to the radiation patterns 96 and 98. For a 360° coverage area divided into n sectors having equal widths $\theta_{sw}$, as shown for example by plot 106 of FIG. 12, the angle $\alpha_n$ for a given sector n may be expressed in terms of multiples of sector widths, by $\alpha_n = \theta_{sw} * (n-1)$, where $n=1 \ldots (360/\theta_{sw})$. Accordingly, the radiation pattern $G_n$ for any sector n, referenced to sector 1, may therefore be given in terms of the sector width $\theta_{sw}$ by $$G_n = G(\theta - \theta_{sw}*[n-1]), n=1 \ldots (360/\theta_{sw}), \quad (2)$$

where $G_1 = G(\theta)$, as expected. For example, if in FIG. 13 it is assumed that the radiation pattern 98 is associated with sector 3, then $G_3 = G(\theta - 2*\theta_{sw})$, where the angle 100 is given by $\alpha_3 = 2*\theta_{sw}$.

With reference again to FIG. 12, the boundaries of each sector indicated by plot 106 may be given as an angle $\theta_{sn}$ from the 0° reference position. These boundary angles $\theta_{sn}$ may also be expressed in terms of the sector width $\theta_{sw}$, by $$\theta_{sn} = \theta_{sw}*(n-1/2), \quad (3)$$

where $\theta_{sn}$ is the angle from the 0° reference position to the boundary between sector n and (n+1), and $n=1 \ldots (360/\theta_{sw})$. Using this formulation, any sectors illustrated to the left of sector 1 in FIG. 12 have boundaries indicated at positive angles from the 0° reference position (from +180° to 360°), rather than the equivalent negative angles as shown in FIG. 12 (from −180° to 0°). Of course, the actual location of the sector boundaries indicated by either representation is the same.

With reference again to FIG. 13, from Eqs. (2) and (3), for a given sector width $\theta_{sw}$, a ratio $[D_1/U_{1n}]$ which compares the desired signal level in sector 1 (from the main lobe 102 of radiation pattern 96) to the undesired signal level in sector 1 due to the sidelobes from any other sector n using the same frequency channels, may be expressed in terms of relative power by $$[D_1/U_{1n}](\theta) = \frac{G_1 * \beta_1}{G_n * \beta_n} = \frac{G(\theta) * \beta_1}{G(\theta - \theta_{sw}*[n-1]) * \beta_n}, \quad (4)$$

where $\beta_1$ is the complex power associated with the radiation pattern $G_1$, $\beta_n$ is the complex power associated with the radiation pattern $G_n$, and the angle $\theta$ is swept through sector 1, i.e. $\theta_{s(360/\theta sw)} \leq \theta \leq \theta_{s1}$. Accordingly, the relation given by Eq. (4) results in a plot of D/U ratio vs. angle within sector 1 for a given sector width $\theta_{sw}$. A minimum of such a plot represents a "worst case" D/U ratio in sector 1 due to interference from sector n.

The above analysis may be extended to include the undesired signal levels in sector 1 due to sidelobes from all sectors n in the coverage area using the same frequency channel, by summing the undesired signal levels from each same frequency channel sector n. If frequency reuse in alternate sectors is assumed, as in the preferred embodiment of the invention, the sum of the undesired signal levels $U_1(\theta)$ in sector 1 due to all other sectors using the same frequency is given by $$U_1(\theta) = \sum_{n=3, n\ odd}^{(360/\theta_{sw})} G_n * \beta_n, \quad (5)$$

where again the angle $\theta$ is swept through sector 1, i.e. $\theta_{s(360/\theta sw)} \leq \theta \leq \theta_{s1}$, and only signal contributions from odd numbered sectors are summed. Using Eqs. (4) and (5), a ratio $[D_1/U_1]$, which compares the desired signal level in sector 1 to the total undesired signal level in sector 1 due to sidelobes from all other sectors n using the same frequency channel, may be expressed in terms of relative power by $$[D_1/U_1](\theta) = \frac{G_1 * \beta_1}{\sum\limits_{n=3, n\ odd}^{(360/\theta_{sw})} G_n * \beta_n}. \quad (6)$$

Similarly to Eq. (4), the relation given by Eq. (6) results in a plot of D/U ratio vs. angle within sector 1 for a given sector width $\theta_{sw}$. A minimum of such a plot represents a "worst case" D/U ratio in sector 1 due to interference from all sectors n using the same frequency channel.

While the analysis leading up to Eq. (6) may be cumbersome, even with the simplifying assumptions of substantially identical spatial profiles for the radiation patterns in each sector, equal sector width, and frequency reuse in alternate sectors, Eq. (6) nevertheless provides an accurate assessment of D/U ratio in a given sector, based on the radiation pattern of the sector and the radiation pattern of each sector using the same frequency channel. For each choice of sector width $\theta_{sw}$, a D/U plot having an associated minimum D/U ratio may be generated for a given sector. An optimum sector width $\theta_{sw}$ may be determined by selecting the sector width which results in the highest minimum D/U ratio for the sector.

While the foregoing discussion was directed to determining an optimum sector width $\theta_{sw}$ based on a plot of D/U ratio for sector 1, which would be identical for all sectors n in view of the simplifying assumptions, the principles outlined above apply equally in determining an optimum sector width for each sector of a coverage area having various radiation patterns amongst the sectors, various sector widths, and arbitrary frequency reuse schemes. For coverage areas spanning up to 360°, in which different radiation patterns and sector widths amongst two or more sectors are used, as well as an arbitrary or custom frequency reuse scheme, the parameters of the method of the invention outlined above may be modified to take into consideration any portion of any radiation pattern throughout the coverage area that may contribute to interference or undesired signal in a given sector of interest. Moreover, the complex powers $\beta_n$ of respective radiation patterns $G_n$ may be arbitrarily selected and different for two or more sectors, which may result in different radii of coverage amongst the sectors, as discussed further below in connection with FIG. 19. Nonetheless, Eq. (6) takes the complex power $\beta_n$ of each radiation pattern $G_n$ into consideration in determining a plot of D/U ratio in a given sector of interest.

Additionally, it should be appreciated that, while in the foregoing analysis the sector width was varied while the radiation patterns were assumed to be fixed, a similar analysis of the D/U ratio in a given sector may be performed, in which sector width is held constant while the radiation patterns $G_n$ are varied for one or more sectors, to determine radiation patterns which maximize D/U ratios in the sectors for fixed sector widths.

The method of the invention outlined above may be significantly simplified while nonetheless providing a suitable D/U ratio for purposes of a practical noise budget analysis of a communication link according to the invention. Recall from the discussion in connection with FIGS. 9 and 10 that the minimum desired signal level in a sector n is generally found at the sector boundaries. This minimum desired signal level $D_{min,n}$ may be used as a "worst case" reference for the desired signal level in calculating the D/U ratio in a sector n, rather than the actual profile $G_n$ of the main lobe in the sector n. Similarly, maximum or average values of sidelobes from any interfering same frequency sectors, for example n+2, n+4, ..., etc. in an embodiment employing an alternate sector frequency reuse scheme, may be used as references for the undesired signal level in the sector n, rather than the actual profiles $G_{n+2}$, $G_{n+4}$, ... etc. of the sidelobes in the sector n. The simplification of this approach is that a single maximum or average value, rather than a series of values as a function of angle, is obtained for the total undesired signal level in sector n. This single value may then be compared to the value $D_{min,n}$ to determine a single conservative D/U ratio in sector n for each choice of sector width $\theta_{sw}$, rather than a plot of D/U ratios vs. angle.

Figure 14:
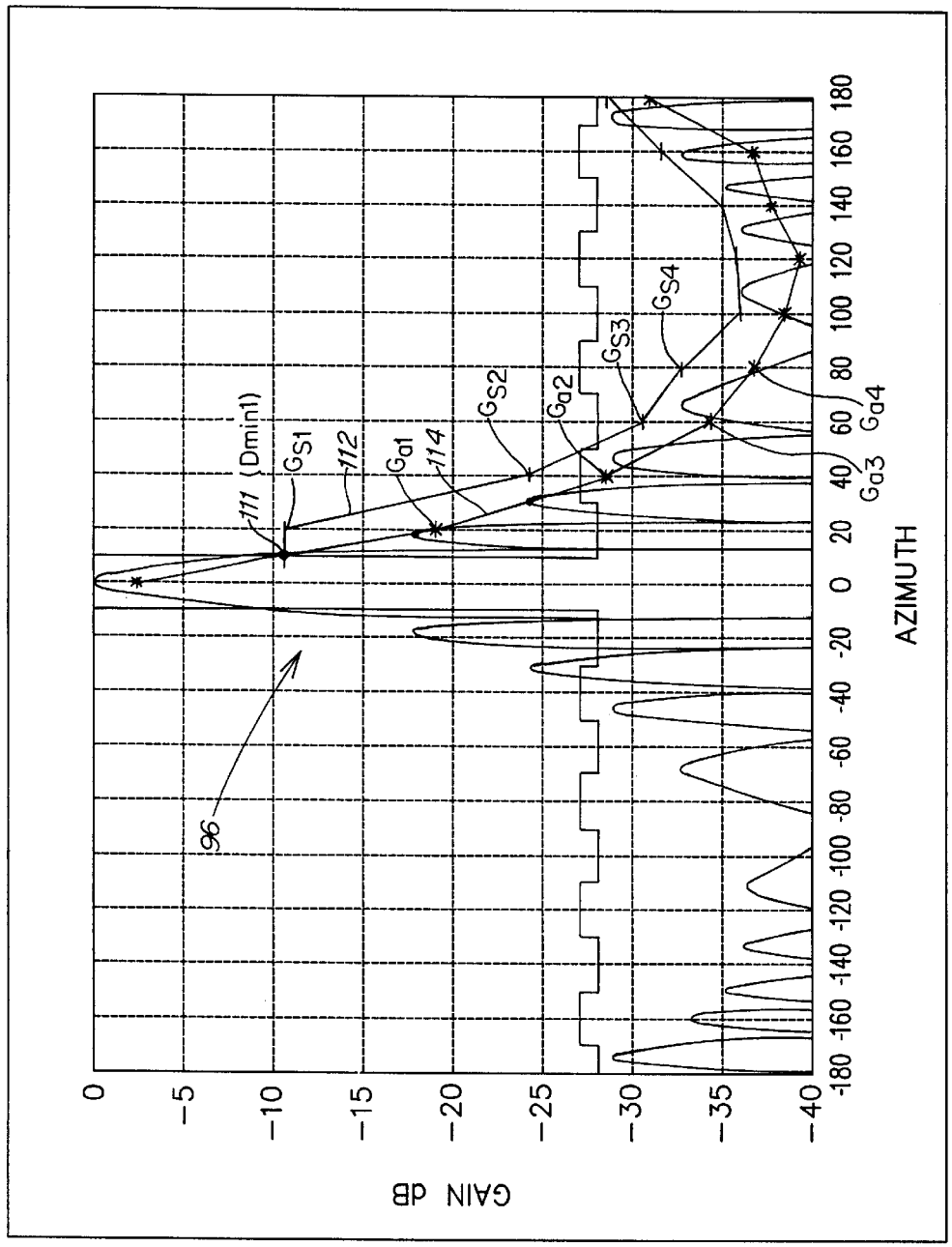
FIG. 14 is the graph of FIG. 12, additionally showing plots of maximum and average signal levels in each sector due to the radiation pattern of FIG. 8.

FIG. 14 is the graph of FIG. 12, additionally showing plots of the maximum and average signal levels in each sector due to the sidelobes 104 of the radiation pattern 96. In FIG. 14, the point 111 indicating the quantity $D_{min1}$, which represents the minimum desired signal level at a boundary of sector 1, may be defined as $$D_{min1} = G(\theta_{s1}) = G(\theta_{sw}/2), \tag{7}$$

where $G(\theta)$ is the radiation pattern 96 associated with sector 1. Similarly, the quantity $G_{sn}$, representing the maximum signal level in sector n of the radiation pattern $G_1 = G(\theta)$, or conversely, the maximum signal level in sector 1 of the radiation pattern $G_n$, assuming identical radiation patterns in all sectors, may be defined as $$G_{sn} = \max[G(\theta)], \text{ for } [\theta_{sw}*(n-3/2)] \leq \theta \leq [\theta_{sw}*(n-1/2)],$$
$$n2 \ldots (360/\theta_{sw}). \tag{8}$$

The maximum value $G_{sn}$ of the undesired signal level represents a worst case upper limit for the interference in sector 1 from sector n. FIG. 14 shows a plot 112 of several values of $G_{sn}$, for n=1–10.

Likewise, the quantity $G_{an}$, representing the average signal level in sector n of the radiation pattern $G_1 = G(\theta)$, or conversely, the average signal level in sector 1 of the radiation pattern $G_n$, assuming identical radiation patterns in all sectors, may be defined as $$G_{an} = \text{ave}[G(\theta)], \text{ for } [\theta_{sw}*(n-3/2)] \leq \theta \leq [\theta_{sw}*(n-1/2)],$$
$$n=2 \ldots (360/\theta_{sw}). \tag{9}$$

FIG. 14 also shows a plot 114 of several values of $G_{an}$, for n=1–10. Using the quantities $G_{sn}$ and $G_{an}$, either a maximum or average value of the undesired signal level in sector 1 due to all sectors n using the same frequency channels, as a function of sector width $\theta_{sw}$, may be obtained.

A worst case scenario D/U ratio for sector 1 may be determined using the sum of all $G_{sn}$ for sectors using the same frequency channels as sector 1, and by assuming that the complex power is radiated simultaneously in all same frequency channel sectors n and is balanced ($\beta_1 = \beta_2 = \beta_n$), coherent, and correlated, so that the maximum undesired signal levels from all potentially interfering sectors add constructively. Accordingly, a simplified version of Eq. (5) for the maximum undesired signal level $U_{max1}$ in sector 1 may be given by $$U_{max1} = \sum_{n=3, n \text{ odd}}^{(360/\theta_{sw})} G_{sn} * \beta_n, \tag{10}$$

and a simplified version of Eq. (6) for a worst case scenario D/U value may be given by $$D_{min1} / U_{max1} = \frac{D_{min1}}{\sum_{n=3, n \text{ odd}}^{(360/\theta_{sw})} G_{sn} * \beta_n}. \tag{11}$$

In practice, depending in part on the modulation/demodulation technique utilized by the modems 44 of the network operation center 40, and also due to slight manufacturing variations of the sectored antenna system 24, the complex power radiated into each sector may not be coherent or correlated with other sectors. Moreover, power may not be radiated simultaneously in all same frequency channel sectors. Additionally, the radiation patterns $G_n$ may vary slightly from sector to sector. For these reasons, a more realistic D/U ratio for sector 1 may be determined using the sum $U_{ave1}$ of all average undesired signal levels $G_{an}$ for sectors using the same frequency channels as sector 1, given by $$U_{ave1} = \sum_{n=3, n \text{ odd}}^{(360/\theta_{sw})} G_{an} * \beta_n. \tag{12}$$

A simplified version of Eq. (6) based on $U_{ave1}$ may then be given by $$D_{min1}/U_{ave1} = \frac{D_{min1}}{\frac{(360/\theta_{sw})}{\sum_{n=3, n\ odd}} G_{an} * \beta_n}. \quad (13)$$

An optimum sector width $\theta_{sw}$, based on the radiation patterns $G_n$ and frequency reuse in alternate sectors, may be determined by evaluating Eq. (13) for a number of sector widths $\theta_{sw}$, and choosing the sector width that results in the highest value for $D_{min1}/U_{ave1}$. Of course, Eq. (11) may be evaluated similarly; however, the optimum sector width determined using Eq. (11) will be based on a worst case value for the D/U ratio. While the worst case D/U ratio may provide a more conservative estimate of the contribution of same frequency channel interference to the overall noise budget of a communication link, the D/U ratio given by Eq. (13) may provide a more practical estimate of this component of the link noise budget. An exemplary range of D/U ratios suitable for purposes of the invention is given by, but is not limited to, 10 to 35 dB. In one embodiment of the invention, suitable D/U ratios may be achieved by selecting sector widths in a range of from the width of a main lobe of a radiation pattern at the −3 dB points, to the width of the main lobe at the −10 dB points. In yet another embodiment, the antenna system of the base station associates radiation patterns having essentially identical spatial profiles with each sector of a 360° coverage area such that a suitable, and more preferably, an optimum D/U ratio for each sector results when the sector width of each sector is approximately 16.4 degrees; namely, in this embodiment, the optimum sector distribution of the 360° coverage area includes 22 contiguous sectors.

Figure 15:
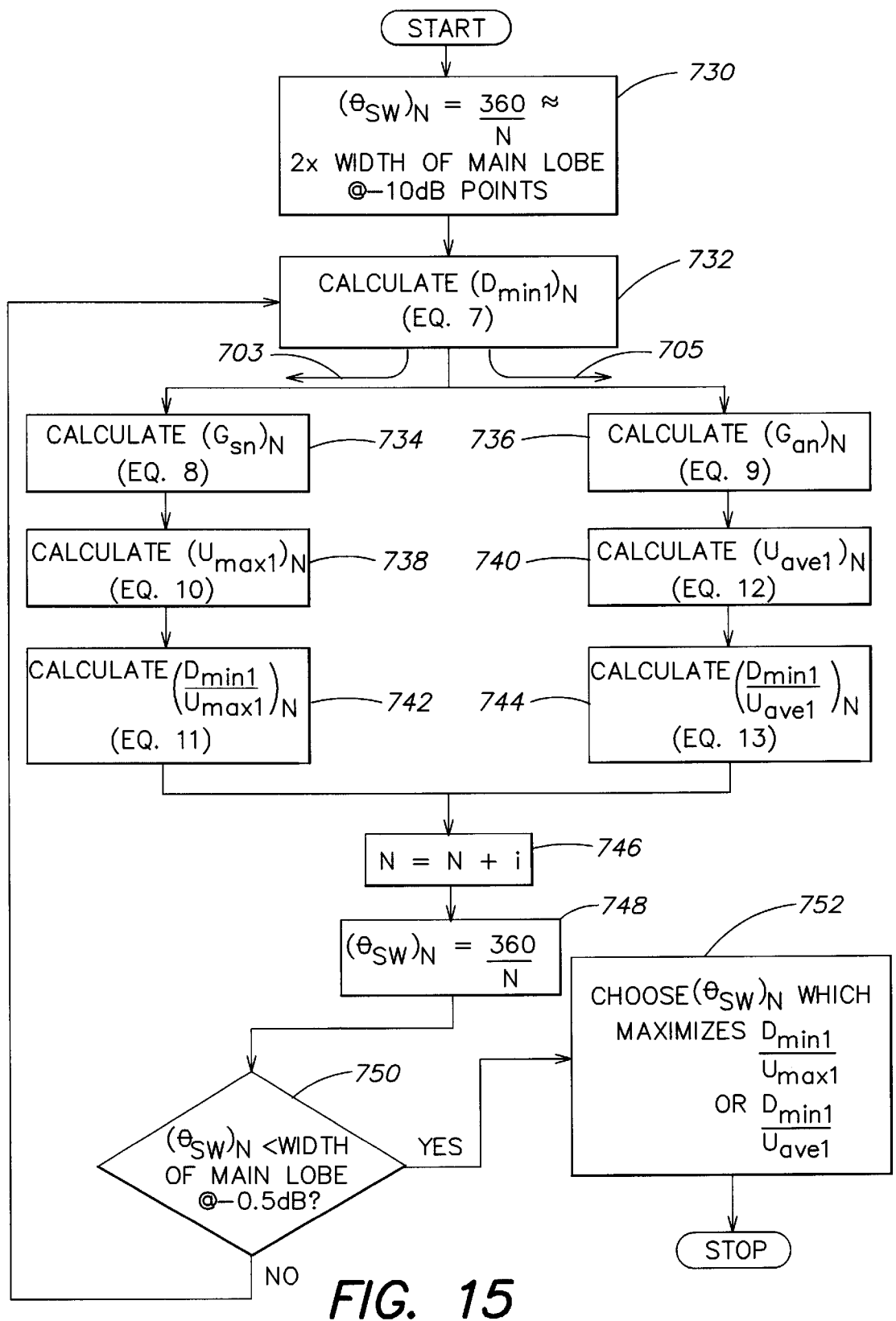
FIG. 15 is a flow chart illustrating the steps of a method for determining an optimum sector distribution within a coverage area, according to one embodiment of the invention.

FIG. 15 is a flow chart showing the steps of a preferred embodiment of the method of the invention, as outlined above, for determining an optimum sector distribution in terms of an optimum sector width $\theta_{sw}$ based on either Eqs. (11) or (13). As discussed above, in other embodiments of the method according to the invention, the radiation patterns of each sector may be varied while holding the sector width of each sector constant to maximize the D/U ratio in each sector.

Referring to the flow chart of FIG. 15, in step 730 an initial sector width $(\theta_{sw})_N = 360/N$ is chosen as a maximum candidate sector width, based on an exemplary coverage area spanning 360°. The variable N represents the total number of sectors into which the coverage area is divided, and may be chosen such that the initial sector width is approximately twice the width of a main lobe profile at the −10 dB points. For example, with reference to FIG. 12, the −10 dB points 108 and 110 of main lobe 102 are indicated at an azimuth of −10° and +10°, respectively, giving a main lobe width of approximately 20°. A value for N may be chosen such that an initial sector width $(\theta_{sw})_N$ is approximately twice the main lobe width, which, in the example of FIG. 12, would be 40°. The foregoing example is for purposes of illustration only and other initial sector widths may be suitable according to other embodiments. In one embodiment, N preferably is chosen to be an even number, which is a particularly appropriate choice for an alternate frequency reuse scheme.

Based on an initial sector width $(\theta_{sw})_N$, in step 732 of FIG. 15 the variable $D_{min1}$ is calculated based on Eq. (7). Once $D_{min1}$ is calculated, the method according to the invention may follow either one or both of the paths indicated by reference characters 703 and 705. The path indicated by reference character 703 ultimately calculates a "worse case" D/U ratio given by Eq. (11), while the path indicated by reference 705 calculates a more conservative D/U ratio given by Eq. (13).

Following the path indicated by reference character 703, in step 794 of FIG. 15 the method of the invention calculates the variable $G_{sn}$ given by Eq. (8). In step 798, the variable $U_{max1}$ is calculated as given by Eq. (10). In step 742, the ratio $D_{min1}/U_{max1}$ is calculated from Eq. (11). Similarly, following the path indicated by reference character 705, the method of the invention calculates the variable $G_{an}$ in step 736 according to Eq. (9). In step 740, the variable $U_{ave1}$ is calculated using Eq. (12). In step 744, the ratio $D_{min1}/U_{ave1}$ is calculated using Eq. (13).

Once one or both of the D/U ratios indicated by Eqs. (11) and (13) are calculated and stored with the current sector width, for example in a conventional memory, in step 746 the total number of sectors indicated by the variable N is incremented by an integer value i, and in step 748 a new sector width is calculated based on the new total number of sectors N. In an embodiment in which N is an even number, N is accordingly incremented by an even integer in step 746. In step 750 the method queries whether the new sector width is less than the width of a main lobe at the −0.5 dB points. If the new sector width is greater than the width of a main lobe at the −0.5 dB points, the method according to the example outlined in FIG. 15 returns to step 752 and calculates a new value for the variable $D_{min1}$ based on the new sector width. If however the new sector width is less than the width of a main lobe at the −0.5 dB points, in step 752 a sector width is chosen corresponding to the maximum value of one or both of the D/U ratios stored by the method.

Accordingly, in the example outlined above, the width of a main lobe at the −0.5 dB points serves approximately as the minimum sector width which is evaluated by the method according to one embodiment of the invention. This criterion for minimum sector width is used for purposes of illustration only in the example outlined in FIG. 15, and both of steps 730 and 750 may be modified to alter the criterion for a minimum and maximum sector width evaluated by the method according to other embodiments of the invention. For example, in one embodiment, the number of sectors N may be incremented by some integer i in step 746, hence reducing the sector width, until the D/U ratios calculated in steps 742 and 744 asymptotically approach some maximum valve. The query step 750 may then inquire as to an incremental change in the D/U ratios, and the method may be exited at step 752 if the incremental change is below some predetermined threshold value.

Once an appropriate D/U ratio or, alternatively, a total undesired signal level due to interference from same frequency channel sectors is obtained, other potential sources of noise as discussed above in connection with FIG. 7, for example other sources of undesired RF energy, may be added to this figure to determine the total noise level on a communication link. This total noise level is compared to the desired signal level at a receiving end of the communication link, and should be within the noise budget dictated by the required signal-to-noise ratio (SNR) of the modem serving the receiving end of the communication link.

With reference again to the downstream channel communication link (base station to subscriber station) shown in FIG. 7, a desired received signal level (RSL) 708 of a data carrier, originating from the link transmitter 45 of the NOC modem 44 and arriving to an input of the subscriber transceiver 64, may be calculated according to one embodiment of the invention as follows. The link transmitter 45 transmits a data carrier 38 having an associated signal level 700, which, for example, may be expressed as a power in units of dBm. For purposes of the following discussion, the internal communication link 34 is assumed to be a low-loss communication link, and hence does not attenuate the signal level 700 received by the base station transceiver 32.

The signal level 700 of data carrier 38 is amplified by a transmitter portion of the base station transceiver 32, which has an adjustable gain 702. The adjustable gain 702 may be selected such that the transmitter portion of the transceiver 32 operates in a linear region to accommodate the modulated signals (for example, QAM modulated signals which preferably require linear channels) output by the NOC modem 44. An amplified transceiver output signal level 704 of the transmitter portion of the transceiver 32 may be attenuated first by a diplexer loss 706 which may be inherent to some types of transceivers as a result of integrating a transmitter and receiver portion, and additionally by some line loss 722 on the link 25. The antenna system 24 provides a gain 720 to the signal 704, minus the attenuation due to the diplexer loss 706 and the line loss 722, to output data carrier 28 having an effective radiated signal level 728 at the outset of the wireless communication link 26.

The wireless communication link 26 is shown in FIG. 7 as having a path length 718 between the base station antenna system 24 and the subscriber antenna 60. The wireless communication link 26 is characterized by a free space path loss 726 which is a function of the path length 718 and the carrier frequency of the frequency channel 28. The path loss 726 is an attenuation factor which is subtracted from the effective radiated signal level 728 of the antenna system 24. To at least partially account for the path loss 726, or a reduction of signal density as the path length 718 increases, the subscriber antenna 60 provides a gain 716 to the received data carrier 28. The link 62 between the subscriber antenna 60 and the subscriber transceiver 64 is assumed to be a low-loss link which does not attenuate the received data carrier 28. Accordingly, the desired received signal level RSL at the input of subscriber transceiver 64, shown in FIG. 7 as reference character 708, may be given as RSL (dBm)=Output of Base Transceiver (704)−Diplexer Loss (706)−Attenuation on line 25 (722)+Antenna System 24 Gain (720)−Free Space Path Loss (726)+Subscriber Antenna 60 Gain (716).    (14)

In a similar manner, the noise sources along the downstream communication link shown in FIG. 7 may be added to arrive at a total noise level (TNL) 714 at an input to the subscriber transceiver 64. For purposes of the present discussion, it is assumed that any noise produced by the NOC modem 44 or the link transmitter 45, as well as any noise due to environmental disturbances over the internal communication link 34 is negligible. Additionally, while phase noise from the transmitter portion of the base station transceiver 32 may also contribute noise to the link, it is assumed in this example that low phase noise transceivers are employed and that the effect of phase noise is negligible. Likewise, it is assumed that any noise due to environmental disturbances which may affect the link 25, as well as the links 62 and 68 of the subscriber station 20 is negligible. This leaves the undesired signal level due to interference from the same frequency channel sectors, indicated by reference character 724 in FIG. 7, and thermal noise contributed by a receiver portion of the subscriber transceiver 64 as the primary sources of noise on the downstream communication link shown in FIG. 7.

The undesired signal level 724 due to interference from same frequency channel sectors may be referenced to an input of the subscriber transceiver 64 and may be expressed as the desired received signal level 708 (RSL, in dBm) minus the D/U ratio for the sector. This approach is appropriate because the subscriber antenna 60 applies essentially the same gain 716 to both the desired and undesired signals on the wireless communication link 26. As discussed above, according to one embodiment of the invention, a sector width is chosen such that the D/U ratio for each sector is in a range of from approximately 10 to 35 dB. The thermal noise power introduced by the receiver portion of the subscriber transceiver 64 may calculated from the relation Thermal Noise (dBm)=−174 dBm+10 log[$BW$]+$NF$,    (15)

where BW is the bandwidth of the frequency channels 38, 28, and 68, and NF is the noise FIG. 710 of the subscriber transceiver 64, discussed further below in connection with FIG. 16. The total noise level 714 (TNL), referenced to an input of the subscriber transceiver 64, is then given by TNL (dBm)=Thermal Noise+Same Channel Interference Noise (724)=Thermal Noise+[RSL (708)−D/U].    (16)

Since the above calculation of the total noise level 714 is referenced to an input of the subscriber transceiver 64 and includes the thermal noise introduced by the subscriber transceiver 64, the receiver portion of the subscriber transceiver 64 amplifies both the desired signal level 708 and the total noise level 714 equivalently by essentially the same gain 712, so that the actual signal-to-noise ratio ($SNR_{actual}$) of the downstream communication link shown in FIG. 7 may be calculated at an input to the subscriber transceiver 64 rather than at the subscriber modem 70. This actual signal-to-noise ratio is given by $SNR_{actual}$(dB)=RSL−TNL,    (17)

where Eqs. (14), (15) and (16) are used.

Finally, the noise margin of the communication link shown in FIG. 7 may be calculated by comparing the actual signal-to-noise ratio given by Eq. (17) to the theoretical SNR requirement for the subscriber modem 70 given in FIG. 2, using the relation Noise Margin (dB)=$SNR_{actual}$−$SNR_{theoretical}$    (18)

Figure 19:
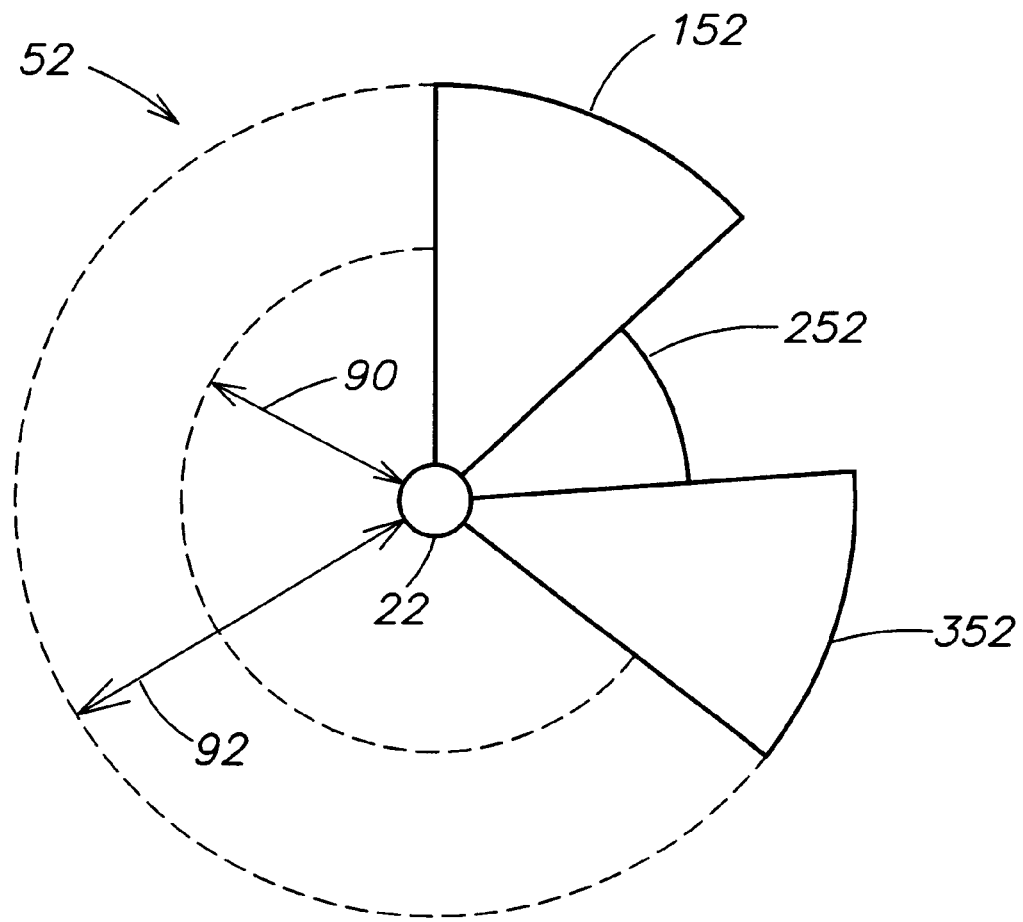
FIG. 19 is a diagram showing an example of a coverage area for the system of FIG. 4 according to one embodiment of the invention, in which at least two sectors have different radii of coverage.

FIGS. 16 and 17 are charts showing exemplary design parameters according to one embodiment of the invention of the base station transceivers 32 and the subscriber transceivers 64, as well as exemplary design parameters of the directional antenna 60 of the fixed subscriber station 20 respectively, which may affect the contribution of these components to the link noise budget. FIG. 19 is a chart showing an example of a communication link budget analysis for one embodiment of the downstream communication link shown in FIG. 7, using relevant parameters from the charts of FIGS. 16 and 17.

From FIG. 16, it can be seen that in this example the signal power 700 of the data carrier 38 input to the base station transceiver 32 may be from −10 to +5 dBm and that the transmitter gain 702 of the transceiver 32 may be adjustable in 1 dB increments from 7 to 51 dB. Additionally, it can be seen from FIG. 16 that the maximum amplified output signal level 704 of the transceiver 32 is 26 dBm. In practice, as indicated in the link budget analysis of FIG. 18, this maximum output signal level 704 is "backed-off" by approximately 5 dB to ensure that the transmitter portion of the transceiver 32 operates in a linear region, thereby minimizing amplitude and phase distortion and hence providing a low noise output. The maximum output signal level, output back-off, and actual output signal level of the transceiver 32 are identified in FIG. 18 by reference characters 704a, 704b, and 704, respectively. Additionally, from FIG. 16 it can be seen that an appropriate power range for the desired received signal level 708 input to the subscriber transceiver 64 preferably is in a range of from −30 to −70 dBm, and that an adjustable gain 712 of the subscriber transceiver 64 may be from −22 to +22 dB. Also, FIG. 16 indicates a noise figure (NF) 710 of 8 dB, which is used to calculate the thermal noise contributed by the receiver portion of the subscriber transceiver 64.

FIG. 17 outlines exemplary design parameters of the directional antenna 60 of the fixed subscriber station 20. From FIG. 17, it can be seen that the gain 716 of the directional antenna 60 in this embodiment is 24 dB. FIG. 17 also shows other parameters of the antenna 60 with respect to backlobe and sidelobe rejection, as well as an acceptable beam width of the data carrier 28 received at the subscriber antenna 60, which insures that the antenna reduces or rejects unwanted radiation impinging on the directional antenna 60 from directions other than that of the incident data carrier 28.

For purposes of illustration, the example of a communication link budget analysis shown in FIG. 18 indicates a path length 718 of 26 miles between the antenna system 24 of the base station 22 and the directional antenna 60 of the subscriber station 20, but other path lengths are possible according to other embodiments. FIG. 18 also indicates the gain 720 of the antenna system 24, as well as the diplexer loss 706 and line loss 722 contributing to signal attenuation on link 25.

As discussed above in connection with FIG. 16, FIG. 18 shows that while a maximum output level of 26 dBm is available from the transmitter portion of base station transceiver 32, this level is "backed-off" 5.0 dB so that the output level 704 of the base station transceiver is a maximum of 21 dBm. Based on this maximum output signal 704 of 21 dBm, on the line loss and diplexer loss, and on an antenna gain 710 of 21 dB, the effective radiated signal level 728 of the antenna system 24 is given in FIG. 18 as 39 dBm, or 7.9 Watts. The free space path loss 726, based on the path length 718 and the carrier frequency of frequency channel 28, is given in FIG. 18 as 132.9 dB, and the subscriber antenna gain 716 is given as 24 dB, from FIG. 17. According to Eq. (14), these parameters result in a desired received signal level (RSL) 708 at an input of subscriber transceiver 64 of −69.9 dBm.

The thermal noise power calculated according to Eq. (15), using a bandwidth of 6 MHz and a noise figure (NF) 710 of 8 dB as indicated in FIG. 16, is given in FIG. 18 as −98.9 dBm. In the analysis of FIG. 18, an exemplary D/U ratio of 30 dB is selected, which results in an undesired signal level 724 due to interference from same frequency channel sectors of −99.9 dBm, based on a desired received signal level RSL of −69.9 dBm. Accordingly, the total noise level (TNL) 714 at an input of the subscriber transceiver 64 given by Eq. (16) is indicated in FIG. 18 as −96.4 dBm, and the actual signal-to-noise ratio according to Eq. (17) is indicated in FIG. 18 as 26.5 dB, resulting in a noise margin of 12.5 dB according to Eq. (18).

It should be appreciated that while in the foregoing example a theoretical SNR requirement of 14 dB was assumed for a modem using a QAM modulation/demodulation technique, other modems using different modulation/demodulations techniques and/or having different SNR requirements may be employed, as long as the actual SNR of the communication link for a given embodiment of the invention is greater than the theoretical SNR requirement; namely, the noise margin preferably should be greater than zero, more preferably greater than 5 dB, and even more preferably greater than 10 dB.

FIG. 19 is a diagram showing an example of a coverage area 52 in which sectors have different radii of coverage. In FIG. 19, the base station 22 is located at the center of the coverage area 52, and a radius of a given sector is measured from the base station 22. For example, in FIG. 19 sectors 152 and 352 have a radius 92, while sector 252 has a radius 90. While FIG. 19 shows that sector 252 is contiguous to both sectors 152 and 352, any two non-contiguous or contiguous sectors of the coverage area 252 may have different radii.

As shown in FIGS. 4 and 5, in a preferred embodiment of the invention the base station 22 includes a transceiver 32 for each sector. The radius of a given sector may be a function of a power level of a transceiver 32 transmitting a radiation pattern into the sector. For some applications, it is desirable to vary the output power level of transceivers 32 corresponding to particular sectors because in some instances the base station 22 must have a greater range in particular sectors. To avoid interference and excessive power usage, it may be undesirable to increase the power output level in all sectors unilaterally if only some sectors require greater range. Accordingly, only the output power level of those sectors requiring a greater range may be increased. As a result, however, identical radiation patterns in all sectors can no longer be assumed, and a determination of an optimum sector distribution according to the method of the invention should take into consideration any changes in sector power levels, and hence, radiation patterns. Such differences in sector power levels may be accounted for, for example, through the complex power variable $\beta_n$, as discussed above in connection with Eq. (4).

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended as limiting.

What is claimed is:

1. A method for determining an optimum sector distribution within a coverage area of a wireless communication system, the coverage area being divided into a plurality of sectors, each sector having a respective sector width, the wireless communication system emitting a respective radiation pattern designated for each sector, the method comprising steps of:

a) selecting the radiation pattern designated for each sector;

b) selecting the sector width of each sector based on the radiation pattern;

c) calculating a desired signal level in a first sector of the plurality of sectors based on the radiation pattern designated for the first sector;

d) calculating a sum of undesired interference levels in the first sector based on the radiation patterns designated for at least some other sectors of the plurality of sectors except the first sector;

e) calculating a ratio of the desired signal level to the sum of the undesired interference levels for the first sector;

f) modifying the sector width of at least the first sector; and g) repeating steps c), d), e), and f) until the ratio for the first sector is maximized.

2. The method of claim 1, further including a step of:
h) repeating steps c), d), e), f) and g) for each sector of the coverage area, substituting consecutive other sectors of the plurality of sectors for the first sector.

3. The method of claim 1, wherein:
the radiation pattern designated for each sector represents a frequency channel having a carrier frequency; and
the step of calculating the sum of the undesired interference levels includes a step of calculating a sum of undesired interference levels in the first sector due to the frequency channels designated for all other sectors of the plurality of sectors having a same carrier frequency as the first sector.

4. The method of claim 3, wherein the frequency channels designated for alternate sectors have the same carrier frequency.

5. The method of claim 1, wherein the step of selecting the radiation pattern designated for each sector includes a step of selecting a spatial profile of the radiation pattern designated for each sector such that at least two radiation patterns have different spatial profiles.

6. The method of claim 1, wherein the step of selecting the radiation pattern designated for each sector includes a step of selecting a power level of the radiation pattern designated for each sector such that at least two radiation patterns have different power levels.

7. The method of claim 1, wherein the step of selecting the radiation pattern designated for each sector includes a step of selecting an essentially identical power level of the radiation pattern designated for each sector.

8. The method of claim 7, wherein the step of selecting the radiation pattern designated for each sector includes a step of selecting an essentially identical spatial profile of the radiation pattern designated for each sector.

9. The method of claim 8, wherein the step of selecting the sector width of each sector includes a step of selecting an essentially identical sector width of each sector.

10. The method of claim 9, wherein the step of modifying the sector width of at least the first sector includes a step of modifying each sector width by a same amount.

11. The method of claim 1, wherein the coverage area spans a 360 degree azimuth.

12. The method of claim 11, wherein:
the radiation pattern designated for each sector represents a frequency channel having a carrier frequency; and
the step of selecting the sector width of each sector includes a step of selecting the sector width of each sector such that the coverage area is divided into a first number of sectors that is divisible by a second number of unique frequency channels.

13. The method of claim 12, wherein the step of modifying the sector width of at least the first sector includes a step of modifying the sector width of each sector such that the coverage area is divided into a third number of sectors different from the first number and divisible by the second number of unique frequency channels.

14. The method of claim 11, wherein the step of selecting the sector width of each sector includes a step of selecting the sector width of each sector such that the coverage area is divided into a first even number of sectors.

15. The method of claim 14, wherein the step of modifying the sector width of at least the first sector includes a step of modifying the sector width of each sector such that the coverage area is divided into a second even number of sectors different from the first even number.

16. The method of claim 14, wherein the step of selecting the sector width of each sector includes a step of selecting an essentially identical sector width of each sector.

17. The method of claim 16, wherein the step of modifying the sector width of at least the first sector includes a step of modifying the sector width of each sector by a same amount such that the coverage area is divided into a second even number of sectors different from the first even number.

18. The method of claim 16, wherein the step of selecting the radiation pattern designated for each sector includes a step of selecting an essentially identical spatial profile of the radiation pattern designated for each sector such that the ratio is maximized when the sector width is approximately 16.4 degrees.

19. The method of claim 1, wherein:
the radiation pattern has a main lobe; and
the step of selecting the sector width of each sector includes a step of selecting twice a width of the main lobe at −10 dB points of the main lobe as the sector width.

20. The method of claim 19, wherein after the step of calculating a ratio, the method further includes steps of:
e1) storing the calculated ratio for the first sector; and
e2) storing the sector width of the first sector.

21. The method of claim 20, wherein the step of modifying the sector width of at least the first sector includes a step of decreasing the sector width of at least the first sector.

22. The method of claim 20, wherein:
the coverage area spans a 360 degree azimuth; and
the step of modifying the sector width of at least the first sector includes a step of decreasing the sector width of each sector such that a number of sectors into which the coverage area is divided is increased by an integer value.

23. The method of claim 22, wherein the step of decreasing the sector width of each sector includes a step of decreasing the sector width of each sector such that the number of sectors into which the coverage area is divided is increased by an even integer value.

24. The method of claim 22, wherein the step of repeating includes steps of:
g1) repeating steps c), d), e), e1), e2) and f) until the sector width is less than a width of the main lobe at −0.5 dB points of the main lobe; and
g2) selecting the stored sector width corresponding to a maximum stored ratio.

25. The method of claim 22, wherein the step of repeating includes steps of:
g1) repeating steps c), d), e), e1), e2) and f) until an incremental change in the ratio is below a predetermined threshold value; and
g2) selecting the stored sector width corresponding to a maximum stored ratio.

26. The method of claim 1, wherein the step of calculating the desired signal level in the first sector includes a step of calculating a minimum desired signal level in the first sector due to the radiation pattern designated for the first sector.

27. The method of claim 26, wherein:
the radiation pattern designated for each sector represents a frequency channel having a carrier frequency; and
the step of calculating the sum of the undesired interference levels includes a step of calculating a sum of average undesired interference levels in the first sector due to the frequency channels designated for all other sectors having a same carrier frequency as the first sector.

28. The method of claim 27, wherein the step of calculating the ratio for the first sector includes a step of calculating a ratio of the minimum desired signal level to the sum of the average undesired interference levels in the first sector.

29. The method of claim 26, wherein:
the radiation pattern designated for each sector represents a frequency channel having a carrier frequency; and
the step of calculating the sum of the undesired interference levels includes a step of calculating a sum of maximum undesired interference levels in the first sector due to the frequency channels designated for all other sectors having a same carrier frequency as the first sector.

30. The method of claim 29, wherein the step of calculating the ratio for the first sector includes a step of calculating a ratio of the minimum desired signal level to the sum of the maximum undesired interference levels in the first sector.

31. The method of claim 1, wherein the radiation pattern has a main lobe and a plurality of sidelobes, the plurality of sidelobes being distributed throughout the coverage area.

32. The method of claim 31, wherein the step of calculating the desired signal level in the first sector includes a step of determining a plot of desired signal levels in the first sector due to the radiation pattern designated for the first sector as a function of a plurality of angles within the first sector.

33. The method of claim 32, wherein:
the radiation pattern designated for each sector represents a frequency channel having a carrier frequency; and
the step of calculating a sum of undesired interference levels includes a step of determining a plot of a sum of undesired interference levels in the first sector, the undesired interference levels being due to the frequency channels designated for all other sectors having a same carrier frequency as the first sector, the plot of the sum being determined as a function of the plurality of angles within the first sector.

34. The method of claim 33, wherein the step of calculating the ratio for the first sector includes a step of determining a plot of ratios of the desired signal level and the sum of the undesired interference levels in the first sector as a function of the plurality of angles within the first sector.

35. The method of claim 34, wherein after the step of determining the plot of the ratios, the method further includes steps of:
e1) storing the plot of the ratios for the first sector; and
e2) storing the sector width of the first sector.

36. The method of claim 35, wherein the step of selecting the sector width of each sector includes a step of selecting approximately twice a width of the main lobe at −10 dB points of the main lobe as the sector width.

37. The method of claim 36, wherein the step of modifying the sector width of at least the first sector includes a step of decreasing the sector width of at least the first sector by a predetermined amount.

38. The method of claim 37, wherein the step of repeating includes steps of:
g1) repeating steps c), d), e), e1), e2) and f) until the sector width of the first sector is less than a width of the main lobe at −0.5 dB points of the main lobe; and
g2) selecting the stored sector width corresponding to the stored plot of the ratios having a highest value of a minimum ratio.

39. A method for determining an optimum sector distribution within a coverage area of a wireless communication system, the coverage area being divided into a plurality of sectors, each sector having a respective sector width, the wireless communication system emitting a respective radiation pattern designated for each sector, the method comprising steps of:
a) selecting the sector width of each sector;
b) selecting the radiation pattern designated for each sector based on the sector width;
c) calculating a desired signal level in a first sector of the plurality of sectors based on the radiation pattern designated for the first sector;
d) calculating a sum of undesired interference levels in the first sector based on the radiation patterns designated for at least some other sectors of the plurality of sectors except the first sector;
e) calculating a ratio of the desired signal level to the sum of the undesired interference levels for the first sector;
f) modifying the radiation pattern designated for at least one sector; and
g) repeating steps c), d), e), and f), substituting the modified radiation pattern designated for the at least one sector for the radiation pattern designated for the at least one sector, until the ratio is maximized.

40. The method of claim 39, wherein:
the radiation pattern designated for each sector represents a frequency channel having a carrier frequency; and
the step of calculating the sum of the undesired interference levels includes a step of calculating a sum of undesired interference levels in the first sector due to the frequency channels designated for all other sectors of the plurality of sectors having a same carrier frequency as the first sector.

41. The method of claim 40, wherein the radiation patterns designated for alternate sectors have the same carrier frequency.

42. The method of claim 39, wherein the step of selecting the radiation pattern designated for each sector includes a step of selecting a spatial profile of the radiation pattern designated for each sector such that at least two radiation patterns have different spatial profiles.

43. The method of claim 39, wherein the step of selecting the radiation pattern designated for each sector includes a step of selecting a power level of the radiation pattern designated for each sector such that at least two radiation patterns have different power levels.

44. The method of claim 39, wherein the step of selecting the radiation pattern designated for each sector includes a step of selecting an essentially identical power level of the radiation pattern designated for each sector.

45. The method of claim 44, wherein the step of selecting the radiation pattern designated for each sector includes a step of selecting an essentially identical spatial profile of the radiation pattern designated for each sector.

46. The method of claim 45, wherein the step of selecting the sector width of each sector includes a step of selecting an essentially identical sector width of each sector.

47. The method of claim 46, wherein the step of modifying the radiation pattern of at least one sector includes a step of identically modifying the radiation pattern of each sector.

48. The method of claim 39, wherein the coverage area spans a 360 degree azimuth.

49. The method of claim 48, wherein:
the radiation pattern designated for each sector represents a frequency channel having a carrier frequency; and
the step of selecting the sector width of each sector includes a step of selecting the sector width of each sector such that the coverage area is divided into a first number of sectors that is divisible by a second number of unique frequency channels.

50. The method of claim 49, wherein the step of modifying the sector width of at least the first sector includes a step of modifying the sector width of each sector such that the coverage area is divided into a third number of sectors different from the first number and divisible by the second number of unique frequency channels.

51. The method of claim 48, wherein the step of selecting the sector width of each sector includes a step of selecting the sector width of each sector such that the coverage area is divided into an even number of sectors.

52. The method of claim 51, wherein the step of selecting the sector width of each sector includes a step of selecting an essentially identical sector width of each sector.

53. The method of claim 39, wherein the step of calculating the desired signal level in the first sector includes a step of calculating a minimum desired signal level in the first sector due to the radiation pattern designated for the first sector.

54. The method of claim 53, wherein:
the radiation pattern designated for each sector represents a frequency channel having a carrier frequency; and
the step of calculating the sum of the undesired interference levels includes a step of calculating a sum of average undesired interference levels in the first sector due to the frequency channels designated for all other sectors having a same carrier frequency as the first sector.

55. The method of claim 54, wherein the step of calculating the ratio for the first sector includes a step of calculating a ratio of the minimum desired signal level to the sum of the average undesired interference levels in the first sector.

56. The method of claim 53, wherein:
the radiation pattern designated for each sector represents a frequency channel having a carrier frequency; and
the step of calculating the sum of the undesired interference levels includes a step of calculating a sum of maximum undesired interference levels in the first sector due to the frequency channels designated for all other sectors using a same carrier frequency as the first sector.

57. The method of claim 56, wherein the step of calculating the ratio includes a step of calculating a ratio of the minimum desired signal level to the sum of the maximum undesired interference levels in the first sector.

58. The method of claim 39, wherein the radiation pattern has a main lobe and a plurality of sidelobes, the plurality of sidelobes being distributed throughout the coverage area.

59. The method of claim 58, wherein the step of calculating the desired signal level in the first sector includes a step of determining a plot of desired signal levels in the first sector due to the radiation pattern designated for the first sector as a function of a plurality of angles within the first sector.

60. The method of claim 59, wherein:
the radiation pattern designated for each sector represents a frequency channel having a carrier frequency; and
the step of calculating a sum of undesired interference levels includes a step of determining a plot of a sum of undesired interference levels in the first sector, the undesired interference levels being due to the frequency channels designated for all other sectors having a same carrier frequency as the first sector, the plot of the sum being determined as a function of the plurality of angles within the first sector.

61. The method of claim 60, wherein the step of calculating the ratio for the first sector includes a step of determining a plot of ratios of the desired signal level and the sum of the undesired interference levels in the first sector as a function of the plurality of angles within the first sector.

* * * * *

UNITED STATES PATENT AND TRADEMARK OFFICE
CERTIFICATE OF CORRECTION

| | | |
|---|---|---|
| PATENT NO. | : 6,418,327 B1 | Page 1 of 1 |
| DATED | : July 9, 2002 | |
| INVENTOR(S) | : Douglas Carey, Thomas Peragine, Edward Dziadek, Naftali Herscovici and Donna Ryan | |

It is certified that error appears in the above-identified patent and that said Letters Patent is hereby corrected as shown below:

<u>Title page,</u>
Item [54], should read as follows:
-- [54] METHODS FOR DETERMINING AN OPTIMUM SECTOR DISTRIBUTION WITHIN A COVERAGE AREA OF A WIRELESS COMMUNICATION SYSTEM --

Signed and Sealed this

Nineteenth Day of November, 2002

*Attest:*

*Attesting Officer*

JAMES E. ROGAN
*Director of the United States Patent and Trademark Office*